(12) United States Patent
Hirano

(10) Patent No.: US 9,555,560 B2
(45) Date of Patent: Jan. 31, 2017

(54) TEMPERATURE CONTROL SEQUENCE DETERMINATION DEVICE, MOLDING DEVICE, RECORDING MEDIUM, AND TEMPERATURE CONTROL SEQUENCE DETERMINATION METHOD

(71) Applicant: SHARP KABUSHIKI KAISHA, Osaka-shi, Osaka (JP)

(72) Inventor: Kenji Hirano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 278 days.

(21) Appl. No.: 14/362,008

(22) PCT Filed: Jul. 30, 2013

(86) PCT No.: PCT/JP2013/070556
§ 371 (c)(1),
(2) Date: May 30, 2014

(87) PCT Pub. No.: WO2014/038313
PCT Pub. Date: Mar. 13, 2014

(65) Prior Publication Data
US 2014/0312519 A1    Oct. 23, 2014

(30) Foreign Application Priority Data

Sep. 4, 2012  (JP) ................................. 2012-194586

(51) Int. Cl.
*B29C 35/02* (2006.01)
(52) U.S. Cl.
CPC ................................ *B29C 35/0288* (2013.01)
(58) Field of Classification Search
CPC ................................................ B29C 35/0288
See application file for complete search history.

(56) References Cited

U.S. PATENT DOCUMENTS 4,510,103 A * 4/1985 Yamaguchi ............. B29C 43/58
264/239
6,490,501 B1 * 12/2002 Saunders ................ G05B 17/02
264/236

FOREIGN PATENT DOCUMENTS

JP        7-40355       2/1995
JP     2001-291723     10/2001
JP        4148400       9/2008

OTHER PUBLICATIONS

International Search Report for PCT/JP2013/070556, mailed Sep. 24, 2013.
English Translation Written Opinion of the International Searching Authority for PCT/JP2013/070556, mailed Sep. 24, 2013.

* cited by examiner

*Primary Examiner* — Mohammad Ali
*Assistant Examiner* — John Park
(74) *Attorney, Agent, or Firm* — Nixon & Vanderhye P.C.

(57) ABSTRACT

A molding device (1) includes a temperature control section (4) and a temperature control sequence determining section (3) that corrects a temperature control sequence for instructing the temperature control section (4) to operate, the temperature control sequence determining section (3) including predicting means (31) for predicting a temporal shift of a thermosetting material (H) and correcting means (32) for correcting a temperature control sequence on the basis of the temporal shift. This arrangement prevents thermal runaway during a process of molding a thermosetting material.

29 Claims, 28 Drawing Sheets

FIG. 7
| Step no. | Target temperature[°C] | Temperature change rate[K/s] | Lapse time[s] |
|---|---|---|---|
| 1 | 50 | — | 30 |
| 2 | 150 | 1.0 | 300 |
| 3 | 100 | 1.0 | 30 |
FIG. 8
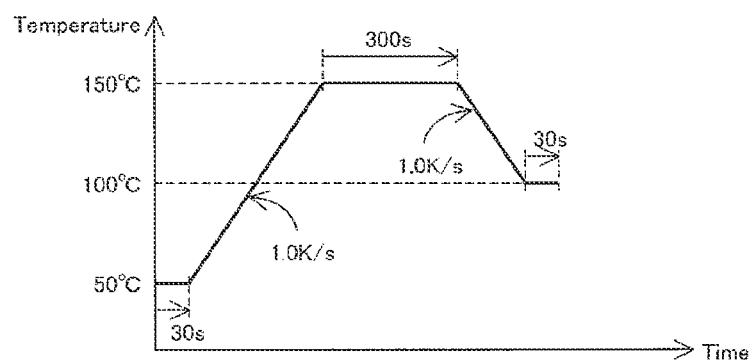
FIG. 9
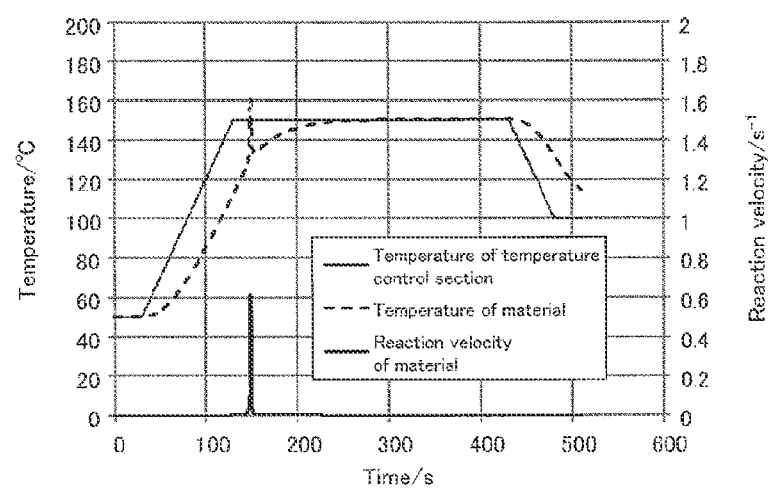

FIG. 10
| Step no. | Target temperature[°C] | Temperature change rate[K/s] | Lapse time[s] |
|---|---|---|---|
| 1 | 50 | --- | 30 |
| 2 | 110 | 1.0 | 0 |
| 3 | 130 | 0.2 | 0 |
| 4 | 150 | 1.0 | 300 |
| 5 | 100 | 1.0 | 30 |
FIG. 11
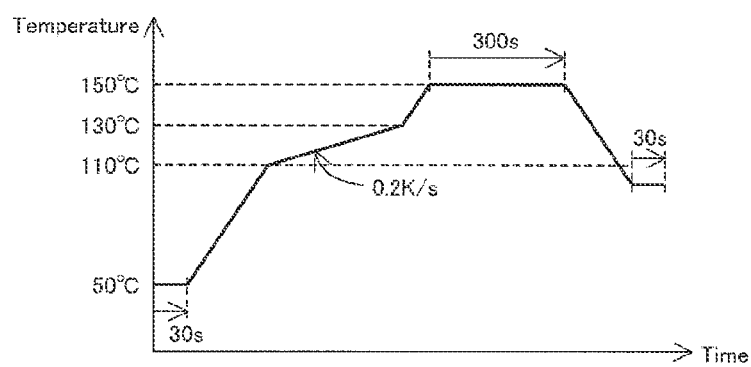
FIG. 12
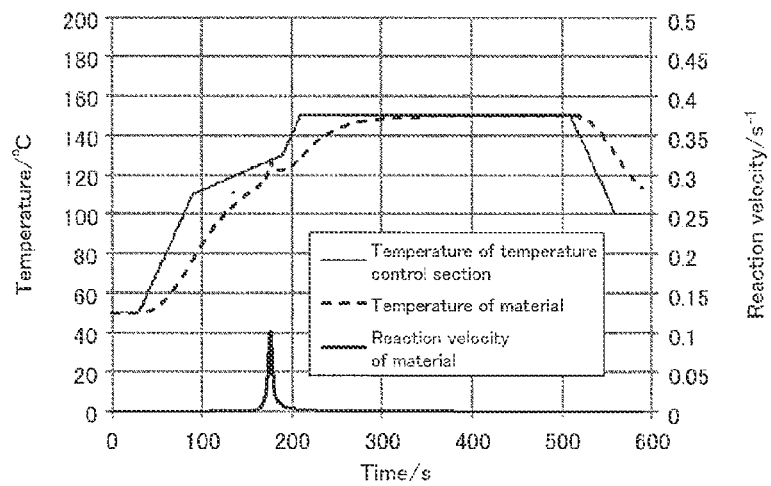

| Step no. | Target temperature[°C] | Temperature change rate[K/s] | Trigger temperature [°C] | Lapse time[s] |
|---|---|---|---|---|
| 1 | 50 | --- | --- | 30 |
| 2 | 150 | --- | 150 | 300 |
| 3 | 100 | --- | 100 | 30 |

| Step no. | Target temperature[°C] | Temperature change rate[K/s] | Trigger temperature [°C] | Lapse time[s] |
|---|---|---|---|---|
| 1 | 50 | — | — | 30 |
| 2 | 100 | — | 100 | 0 |
| 3 | 120 | 0.2 | 120 | 0 |
| 4 | 150 | — | 150 | 300 |
| 5 | 100 | — | 100 | 30 |

| Step no. | Target temperature[°C] | Temperature change rate[K/s] | Trigger temperature [°C] | Lapse time[s] |
|---|---|---|---|---|
| 1 | 50 | — | — | 30 |
| 2 | 120 | — | 100 | 0 |
| 3 | 100 | — | — | 0 |
| 4 | 120 | 0.2 | 118 | 0 |
| 5 | 150 | — | 140 | 400 |
| 6 | 100 | — | 100 | 30 |

FIG. 29
| Step no. | Target temperature[°C] | Temperature change rate[K/s] | Lapse time[s] |
|---|---|---|---|
| 1 | 50 | --- | 30 |
| 2 | 150 | 1.0 | 300 |
| 3 | 100 | 1.0 | 30 |
FIG. 30
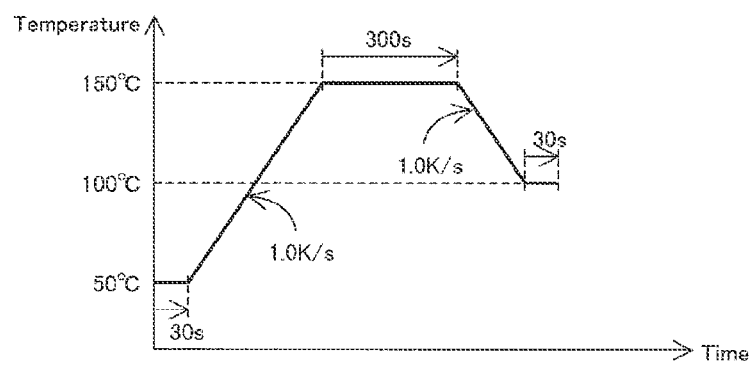
FIG. 31
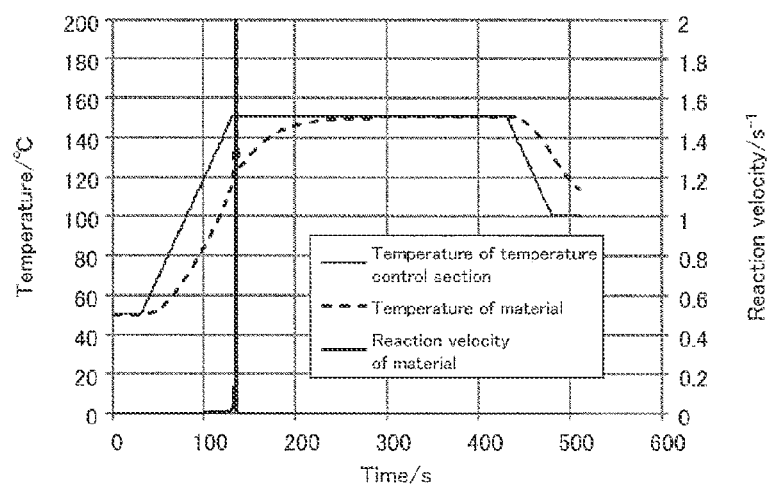

FIG. 32
| Step no. | Target temperature[°C] | Temperature change rate[K/s] | Lapse time[s] |
|---|---|---|---|
| 1 | 50 | --- | 30 |
| 2 | 110 | 1.0 | 0 |
| 3 | 130 | 0.2 | 0 |
| 4 | 150 | 1.0 | 300 |
| 5 | 100 | 1.0 | 30 |
FIG. 33
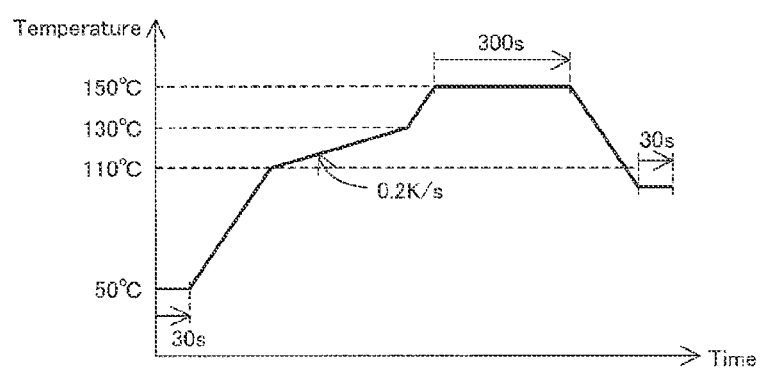
FIG. 34
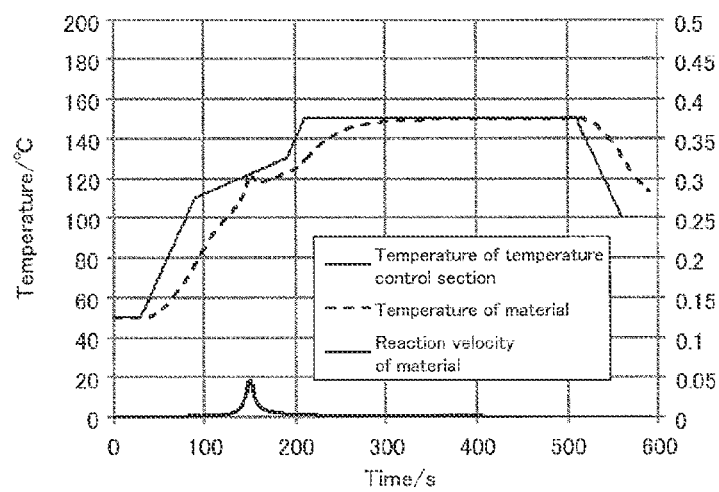

FIG. 35

| Step no. | Target temperature[°C] | Temperature change rate[K/s] | Lapse time[s] |
|---|---|---|---|
| 1 | 50 | — | 30 |
| 2 | 110 | 1.0 | 0 |
| 3 | 130 | 0.2 | 0 |
| 4 | 150 | 1.0 | 300 |
| 5 | 100 | 1.0 | 30 |

FIG. 36

| No. | Step number | Item |
|---|---|---|
| 1 | 3 | Target temperature |
| 2 | 3 | Temperature change rate |
| 3 | 4 | Target temperature |

FIG. 37

| Operation name | Parameter 1 (p1) | Parameter 2 (p2) | Parameter 3 (p3) | Description of operation |
|---|---|---|---|---|
| Output operand | | | | |
| temperature | Heat circuit block number or node number | Heat circuit block number or node number | Specifying time or maximum/minimum | Temperature difference between temperature p1 (with p2 unspecified) and p2 when vi = p1; Add $w_i(v_i-t_i)^2$ to f |
| rate | Heat circuit block number | Heat circuit block number | Specifying time or maximum/minimum | Reaction velocity difference between reaction velocity p1 (with p2 unspecified) and p2 when vi = p1; Add $w_i(v_i-t_i)^2$ to f |
| ratio | Heat circuit block number | Heat circuit block number | Specifying time or maximum/minimum | Reaction rate difference between reaction rate p1 (with p2 unspecified) and p2 when vi = p1; Add $w_i(v_i-t_i)^2$ to f |
| time | Temperature control step number | --- | --- | vi = time having elapsed at end of step; Add $w_i(v_i-t_i)^2$ to f |
| Arithmetic operand | | | | |
| less than | Operand row number | --- | --- | Add $w_i(v_{p1}-t_i)^2$ to f when $v_{p1} > t_i$ |
| greater than | Operand row number | --- | --- | Add $w_i(v_{p1}-t_i)^2$ to f when $v_{p1} < t_i$ |
| add | Operand row number | Operand row number | --- | $v_i = v_{p1} + v_{p2}$; Add $w_i(v_i-t_i)^2$ to f |
| subtract | Operand row number | Operand row number | --- | $v_i = v_{p1} - v_{p2}$; Add $w_i(v_i-t_i)^2$ to f |
| multiply | Operand row number | Constant | --- | $v_i = p2 \times v_{p1}$; Add $w_i(v_i-t_i)^2$ to f |
| divide | Operand row number | Operand row number | --- | $v_i = v_{p1} \div v_{p2}$; Add $w_i(v_i-t_i)^2$ to f |
| Control operand | | | | |
| set material | Heat circuit block number | Specify thermal conductivity, specific heat, or density | --- | Change value of thermal conductivity, specific heat, or density of specified heat circuit block to $t_i$ |
| set size | Heat circuit block number | Specify thickness or sectional area | --- | Change value of thickness or sectional area of specified heat circuit block to $t_i$ |
| set reaction | Heat circuit block number | Specify reaction parameter $A_1$, $T_1$, $A_2$, $T_2$, m, n, or Q | --- | Change value of density d of specified heat circuit block to $t_i$ |
| set sequence | Temperature control step number | Specify target temperature, temperature change rate, or lapse time | --- | Change value of target temperature at specified step to $t_i$ |

FIG. 38

| No. | Operation name | Parameter 1 | Parameter 2 | Parameter 3 | Target value | Weight |
|---|---|---|---|---|---|---|
| 1 | time | Step 5 | | | 600 | 0 |
| 2 | less than | Operand 1 | | | 600 | 0.01 |
| 3 | temperature | Node 2 | Node 1 | Maximum | 10 | 0 |
| 4 | less than | Operand 3 | | | 10 | 1 |
| 5 | rate | Block 2 | | Maximum | 0.1 | 0 |
| 6 | less than | Operand 5 | | | 0.1 | 100 |
| . | . | . | . | . | . | . |
| . | . | . | . | . | . | . |
| . | . | . | . | . | . | . |

TEMPERATURE CONTROL SEQUENCE DETERMINATION DEVICE, MOLDING DEVICE, RECORDING MEDIUM, AND TEMPERATURE CONTROL SEQUENCE DETERMINATION METHOD

This application is the U.S. national phase of International Application No. PCT/JP2013/070556, filed 30 Jul. 2013, which designated the U.S. and claims priority to JP Application No. 2012-194586, filed 4 Sep. 2012, the entire contents of each of which are hereby incorporated by reference.

TECHNICAL FIELD

The present invention relates to a temperature control sequence determining device for use in molding a target object made of a thermosetting material. More specifically, the present invention relates to a temperature control sequence determining device, a molding device, a program, a recording medium, and a temperature control sequence determining method each of which makes it possible to simulate in advance a property change in a thermosetting material during a molding process for an optimal temperature control.

BACKGROUND ART

A thermosetting material such as thermosetting resin starts a curing reaction on heating, the curing reaction having a velocity that increases with a rise in temperature of the thermosetting material. Further, since this curing reaction is normally an exothermic reaction, the thermosetting material generates heat (self heat generation) as the curing reaction progresses.

When a thermosetting material is thermally cured to be molded, the temperature of the thermosetting material is increased as it is heated by external means and also as a result of self heat generation. This temperature increases further accelerates the curing reaction, with the result of such excessive heating causing thermal runaway, that is, causing the curing reaction to progress drastically.

FIG. 40 is a graph for illustrating thermal runaway caused by excessive heating in a thermosetting material. As illustrated in FIG. 40, excessive heating causes the velocity of a curing reaction in a thermosetting material to increase drastically, which in turn causes thermal runaway in the thermosetting material. Thermal runaway may problematically result in a molded article having unevenness in physical property, deformation, residual stress, and/or decrease in strength.

In relation to such a problem, Patent Literature 1 discloses a technique of (i) predicting, on the basis of (a) a formula for calculating the velocity of a curing reaction occurring in a thermosetting material, (b) an equation of heat balance in an autoclave, (c) a measured value of the atmosphere temperature in the autoclave, and (d) a measured value of the temperature of the thermosetting material, a temperature change to occur in the thermosetting material after the current time instant and thus (ii) controlling the atmosphere temperature.

CITATION LIST

Patent Literature 1
Japan patent publication No. 4148400 (Publication date: Sep. 10, 2008)

SUMMARY OF INVENTION

Technical Problem

Conventional techniques such as the above technique, in the case of controlling the temperature of a thermosetting material with use of a temperature control section such as an electric heater of an autoclave or pressing device, normally involve a delay time of several tens of seconds or longer. Thus, in the case of molding a thermosetting material having so high a curing reaction velocity that the curing reaction progresses on the order of seconds, feeding back a measured value of the temperature of the thermosetting material for temperature control is unfortunately too late to suppress thermal runaway. Conventional techniques, in consequence, problematically fail to prevent thermal runaway sufficiently.

The present invention has been accomplished in view of the above problem. It is an object of the present invention to provide a temperature control sequence determining device, a molding device, a program, a recording medium, and a temperature control sequence determining method each of which makes it possible to suppress thermal runaway in a thermosetting material during a molding process and thus prevent a molded article from having such problems as unevenness in physical property, deformation, residual stress, and decrease in strength.

Solution to Problem

In order to solve the above problem, a temperature control sequence determining device according to one mode of the present invention is a temperature control sequence determining device for use in a molding device, the molding device including: a heat transfer section for exchanging heat with a target object made of a thermosetting material; and a temperature control section for controlling a temperature of the temperature control section itself or of the heat transfer section, the temperature control sequence determining device being for correcting a temperature control sequence specifying an operation of the temperature control section, the temperature control sequence determining device including: predicting means for predicting a temporal shift in temperature and curing reaction velocity of the thermosetting material during a process of molding the target object; and correcting means for correcting the temperature control sequence on a basis of the temporal shift predicted by the predicting means, the predicting means, on a basis of (i) a calculation formula below for calculating the curing reaction velocity of the thermosetting material, $$\frac{d\chi}{dt} = \left\{ A_1 \exp\left(-\frac{T_1}{T}\right) + A_2 \exp\left(-\frac{T_2}{T}\right)\chi^m \right\}(1-\chi)^n, \qquad \text{[Math. 1]}$$

where
$d\chi/dt$ is the curing reaction velocity of the thermosetting material,
$\chi$ is a curing reaction rate of the thermosetting material,
t is time, T is an absolute temperature of the thermosetting material, and $A_1$, $T_1$, $A_2$, $T_2$, m, and n are reaction parameters peculiar to the thermosetting material, (ii) a calculation formula below for calculating a quantity of heat generated by the thermosetting material, $$q = QM\frac{d\chi}{dt}, \qquad \text{[Math. 2]}$$

where q is the quantity of the heat generated by the thermosetting material,

Q is a total generated heat density peculiar to the thermosetting material, and

M is a mass of the thermosetting material, (iii) an equivalent heat circuit for equivalently expressing heat generation and heat transfer in the thermosetting material, the heat transfer section, and the temperature control section by using a combination selected from among a temperature source, a heat flow source, thermal resistance, and heat capacity, and (iv) the temperature control sequence before the correction, predicting the temporal shift for a case in which the operation of the temperature control section is specified by the temperature control sequence.

In order to solve the above problem, a temperature control sequence determining method according to one mode of the present invention is a temperature control sequence determining method for use in a molding device, the molding device including: a heat transfer section for exchanging heat with a target object made of a thermosetting material; and a temperature control section for controlling a temperature of the temperature control section itself or of the heat transfer section, the temperature control sequence determining method being for correcting a temperature control sequence specifying an operation of the temperature control section, the temperature control sequence determining method including the steps of: (a) predicting a temporal shift in temperature and curing reaction velocity of the thermosetting material during a process of molding the target object; and (b) correcting the temperature control sequence on a basis of the temporal shift predicted in the step (a), the step (a), on a basis of (i) a calculation formula below for calculating the curing reaction velocity of the thermosetting material, $$\frac{d\chi}{dt} = \left\{A_1\exp\left(-\frac{T_1}{T}\right) + A_2\exp\left(-\frac{T_2}{T}\right)\chi^m\right\}(1-\chi)^n, \qquad \text{[Math. 4]}$$

where $d\chi/dt$ is the curing reaction velocity of the thermosetting material, $\chi$ is a curing reaction rate of the thermosetting material, t is time, T is an absolute temperature of the thermosetting material, and $A_1$, $T_1$, $A_2$, $T_2$, m, and n are reaction parameters peculiar to the thermosetting material, (ii) a calculation formula below for calculating a quantity of heat generated by the thermosetting material, $$q = QM\frac{d\chi}{dt}, \qquad \text{[Math. 5]}$$

where q is the quantity of the heat generated by the thermosetting material,

Q is a total generated heat density peculiar to the thermosetting material, and

M is a mass of the thermosetting material, (iii) an equivalent heat circuit for equivalently expressing respective amounts of heat generation and heat transfer in the thermosetting material, the heat transfer section, and the temperature control section by using a combination selected from among a temperature source, a heat flow source, thermal resistance, and heat capacity, and (iv) the temperature control sequence before the correction, predicting the temporal shift for a case in which the operation of the temperature control section is specified by the temperature control sequence.

The above method is arranged as follows: The step (a) predicts a temporal shift in temperature and curing reaction velocity of a thermosetting material during a target object molding process with use of (i) a calculation formula for calculating the curing reaction velocity of the thermosetting material, (ii) a calculation formula for calculating the quantity of heat generated in the thermosetting material, (iii) an equivalent heat circuit for equivalently expressing heat generation and heat transfer in the thermosetting material, the heat transfer section, and the temperature control section, and (iv) a temperature control sequence specifying an operation of the temperature control section. The step (b) then corrects the temperature control sequence, specifying an operation of the temperature control section, on the basis of the temporal shift predicted in the step (a). This arrangement makes it possible to start temperature control for the temperature control section on the basis of the corrected temperature control sequence.

The above method is consequently a temperature control sequence determining method that makes it possible to suppress thermal runaway in a thermosetting material during a molding process and thus prevent a molded article from having such problems as unevenness in physical property, deformation, residual stress, and decrease in strength.

Advantageous Effects of Invention

As described above, a temperature control sequence determining device according to one mode of the present invention is a temperature control sequence determining device for use in a molding device, the molding device including: a heat transfer section for exchanging heat with a target object made of a thermosetting material; and a temperature control section for controlling a temperature of the temperature control section itself or of the heat transfer section, the temperature control sequence determining device being for correcting a temperature control sequence specifying an operation of the temperature control section, the temperature control sequence determining device including: predicting means for predicting a temporal shift in temperature and curing reaction velocity of the thermosetting material during a process of molding the target object; and correcting means for correcting the temperature control sequence on a basis of the temporal shift predicted by the predicting means, the predicting means, on a basis of (i) a calculation formula below for calculating the curing reaction velocity of the thermosetting material, $$\frac{d\chi}{dt} = \left\{A_1\exp\left(-\frac{T_1}{T}\right) + A_2\exp\left(-\frac{T_2}{T}\right)\chi^m\right\}(1-\chi)^n, \qquad \text{[Math. 7]}$$

where dχ/dt is the curing reaction velocity of the thermosetting material,

χ is a curing reaction rate of the thermosetting material, t is time,

T is an absolute temperature of the thermosetting material, and $A_1$, $T_1$, $A_2$, $T_2$, m, and n are reaction parameters peculiar to the thermosetting material, (ii) a calculation formula below for calculating a quantity of heat generated by the thermosetting material, $$q = QM\frac{d\chi}{dt}, \quad \text{[Math. 8]}$$

where q is the quantity of the heat generated by the thermosetting material,

Q is a total generated heat density peculiar to the thermosetting material, and

M is a mass of the thermosetting material, (iii) an equivalent heat circuit for equivalently expressing heat generation and heat transfer in the thermosetting material, the heat transfer section, and the temperature control section by using a combination selected from among a temperature source, a heat flow source, thermal resistance, and heat capacity, and (iv) the temperature control sequence before the correction, predicting the temporal shift for a case in which the operation of the temperature control section is specified by the temperature control sequence.

Further, a temperature control sequence determining method according to one mode of the present invention is a temperature control sequence determining method for use in a molding device, the molding device including: a heat transfer section for exchanging heat with a target object made of a thermosetting material; and a temperature control section for controlling a temperature of the temperature control section itself or of the heat transfer section, the temperature control sequence determining method being for correcting a temperature control sequence specifying an operation of the temperature control section, the temperature control sequence determining method including the steps of: (a) predicting a temporal shift in temperature and curing reaction velocity of the thermosetting material during a process of molding the target object; and (b) correcting the temperature control sequence on a basis of the temporal shift predicted in the step (a), the step (a), on a basis of (i) a calculation formula below for calculating the curing reaction velocity of the thermosetting material, $$\frac{d\chi}{dt} = \left\{ A_1 \exp\left(-\frac{T_1}{T}\right) + A_2 \exp\left(-\frac{T_2}{T}\right) \chi^m \right\} (1-\chi)^n, \quad \text{[Math. 9]}$$

where dχ/dt is the curing reaction velocity of the thermosetting material,

χ is a curing reaction rate of the thermosetting material, t is time,

T is an absolute temperature of the thermosetting material, and $A_1$, $T_1$, $A_2$, $T_2$, m, and n are reaction parameters peculiar to the thermosetting material, (ii) a calculation formula below for calculating a quantity of heat generated by the thermosetting material, $$q = QM\frac{d\chi}{dt}, \quad \text{[Math. 10]}$$

where q is the quantity of the heat generated by the thermosetting material,

Q is a total generated heat density peculiar to the thermosetting material, and

M is a mass of the thermosetting material, (iii) an equivalent heat circuit for equivalently expressing respective amounts of heat generation and heat transfer in the thermosetting material, the heat transfer section, and the temperature control section by using a combination selected from among a temperature source, a heat flow source, thermal resistance, and heat capacity, and (iv) the temperature control sequence before the correction, predicting the temporal shift for a case in which the operation of the temperature control section is specified by the temperature control sequence.

Consequently, one mode of the present invention advantageously makes it possible to provide a temperature control sequence determining device, a molding device, a program, a recording medium, and a temperature control sequence determining method each of which makes it possible to suppress thermal runaway in a thermosetting material during a molding process and thus prevent a molded article from having such problems as unevenness in physical property, deformation, residual stress, and decrease in strength.

Figure 3:
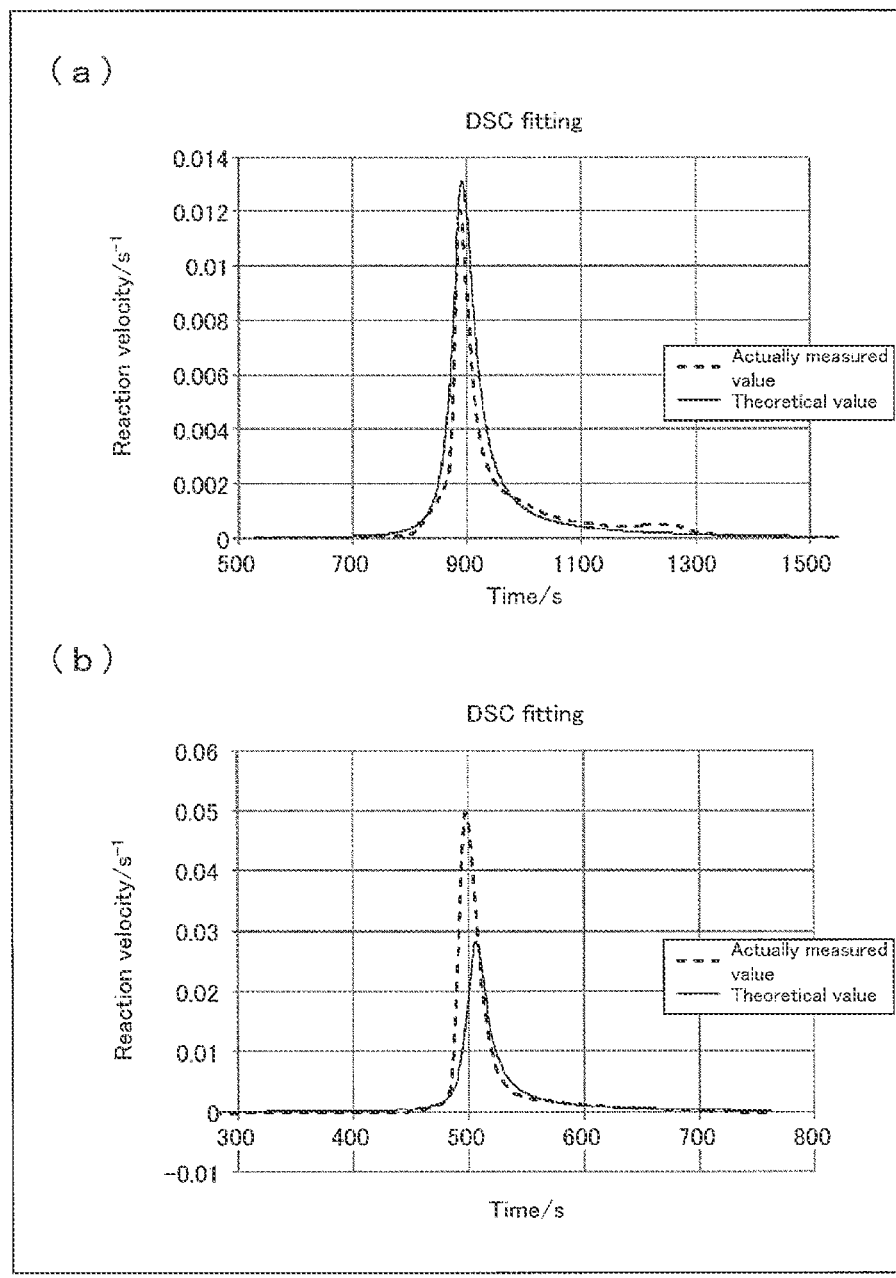

(a) of FIG. 3 is a graph illustrating an example temporal change in reaction velocity as obtained through DSC measurement of a sample at a temperature rise rate of 5 K/minute, and (b) of FIG. 3 is a graph illustrating an example temporal change in reaction velocity as obtained through DSC measurement of a sample at a temperature rise rate of 10 K/minute.

Figure 4:
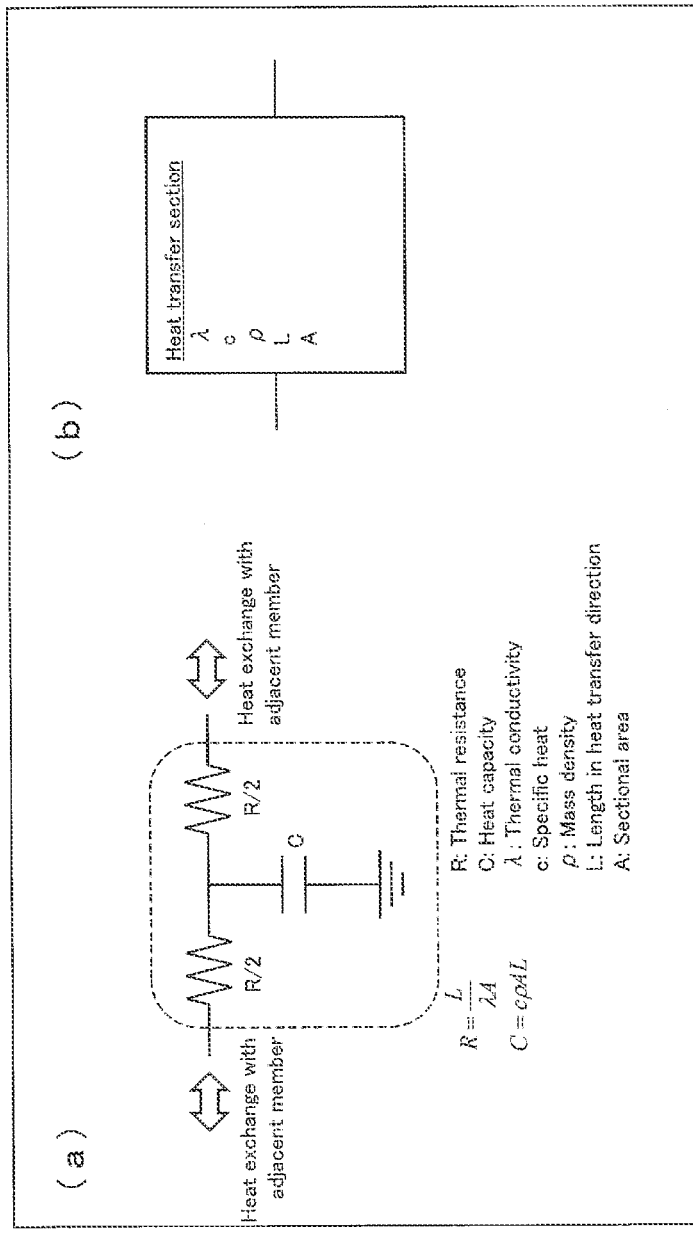

(a) of FIG. 4 is a circuit diagram illustrating an equivalent heat circuit that expresses heat transfer in one-dimensional directions in a heat transfer section, and (b) of FIG. 4 is a diagram schematically illustrating the equivalent heat circuit of (a) of FIG. 4 as a block.

Figure 5:
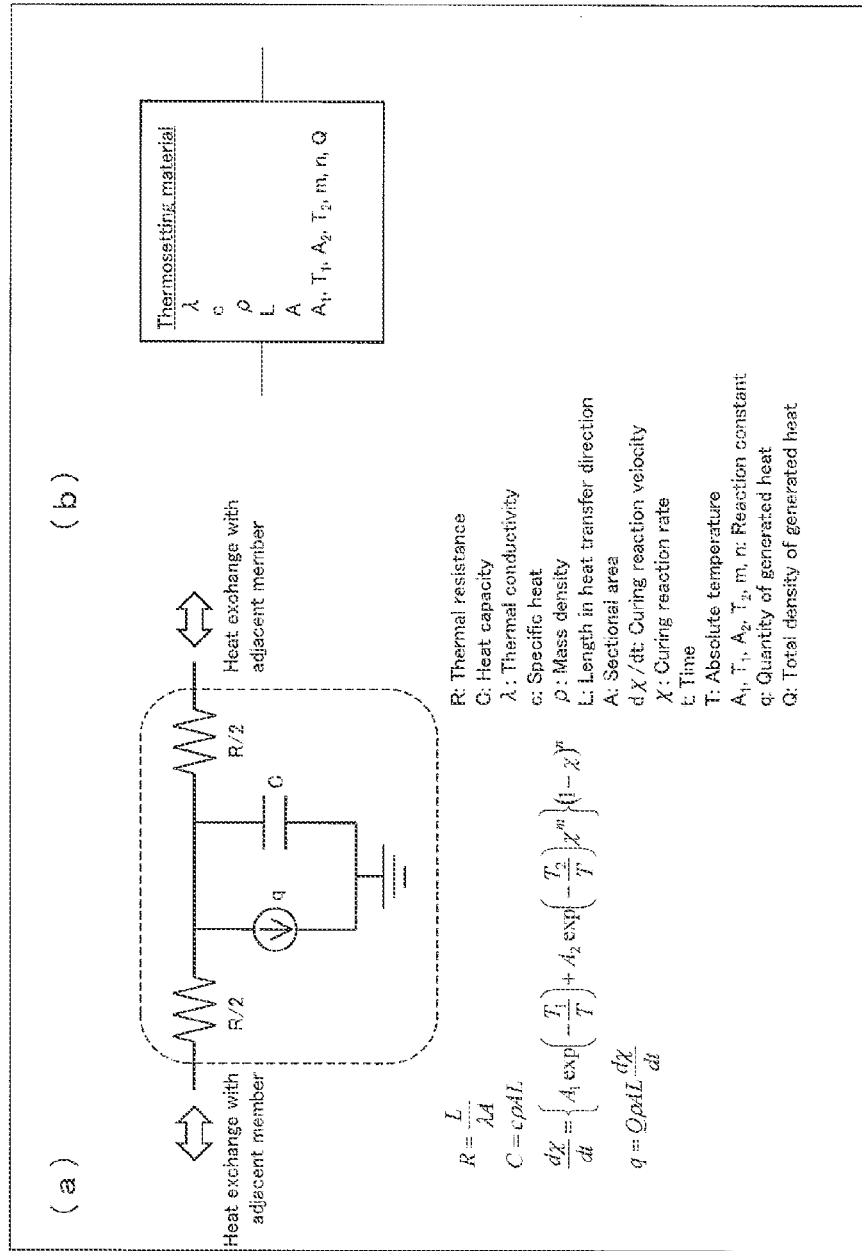

(a) of FIG. 5 is a circuit diagram illustrating an equivalent heat circuit that expresses generation of heat in a thermosetting material and heat transfer in one-dimensional directions, and (b) of FIG. 5 is a diagram schematically illustrating the equivalent heat circuit of (a) of FIG. 5 as a block.

Figure 6:
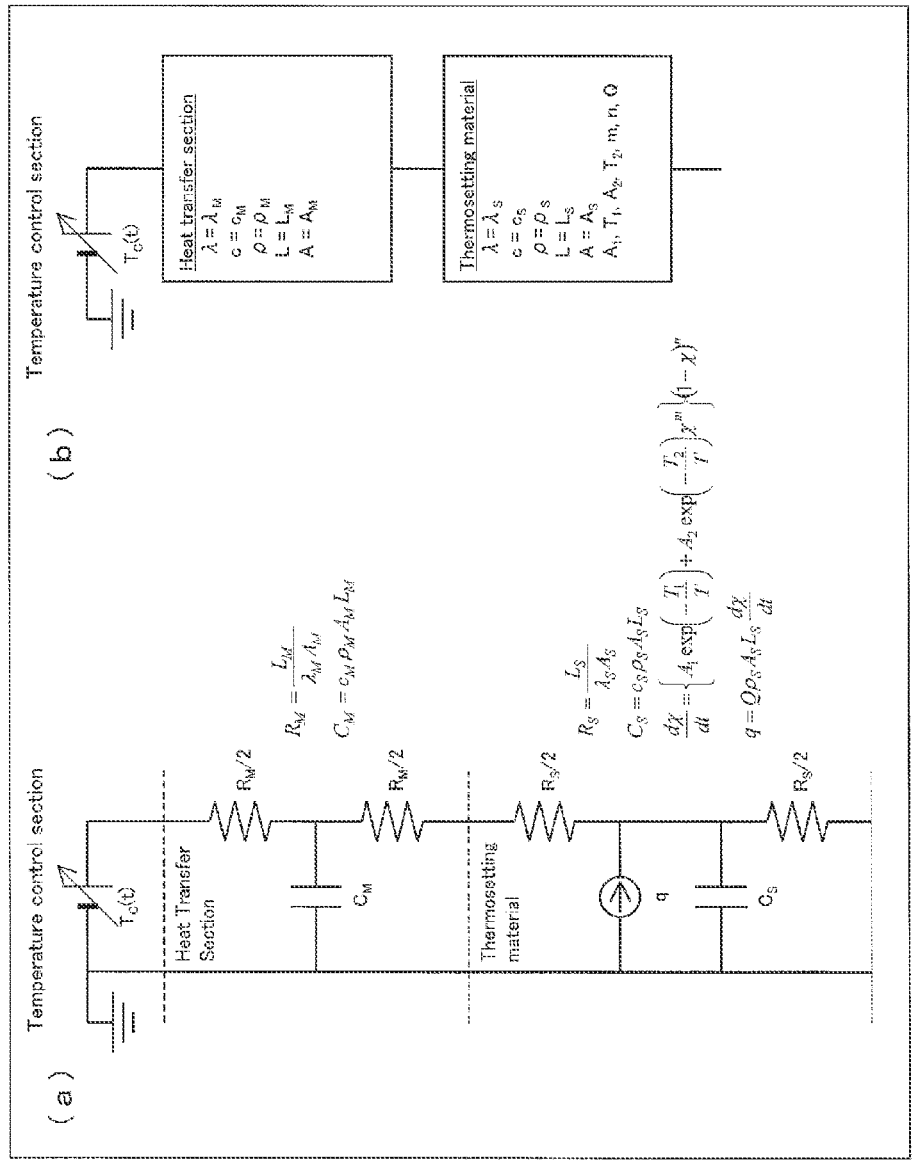

(a) of FIG. 6 illustrates an equivalent heat circuit that expresses heat generation and heat transfer in one-dimensional directions in a heat transfer section, a thermosetting material, and a temperature control section, and (b) of FIG. 6 is a diagram schematically illustrating the equivalent heat circuit of (a) of FIG. 6 as blocks.

FIG. 7 is a table that defines an initial temperature control sequence.

FIG. 8 is a graph schematically illustrating a temperature change profile for a temperature control section, the profile corresponding to the initial temperature control sequence shown in FIG. 7.

FIG. 9 is a graph illustrating the result of a thermal response simulation performed by predicting means.

FIG. 10 is a table that defines a corrected temperature control sequence.

FIG. 11 is a graph schematically illustrating a temperature change profile for a temperature control section, the profile corresponding to the corrected temperature control sequence shown in FIG. 10.

FIG. 12 is a graph illustrating the result of a thermal response simulation for the case in which the corrected temperature control sequence shown in FIG. 10 has been executed.

Figure 13:
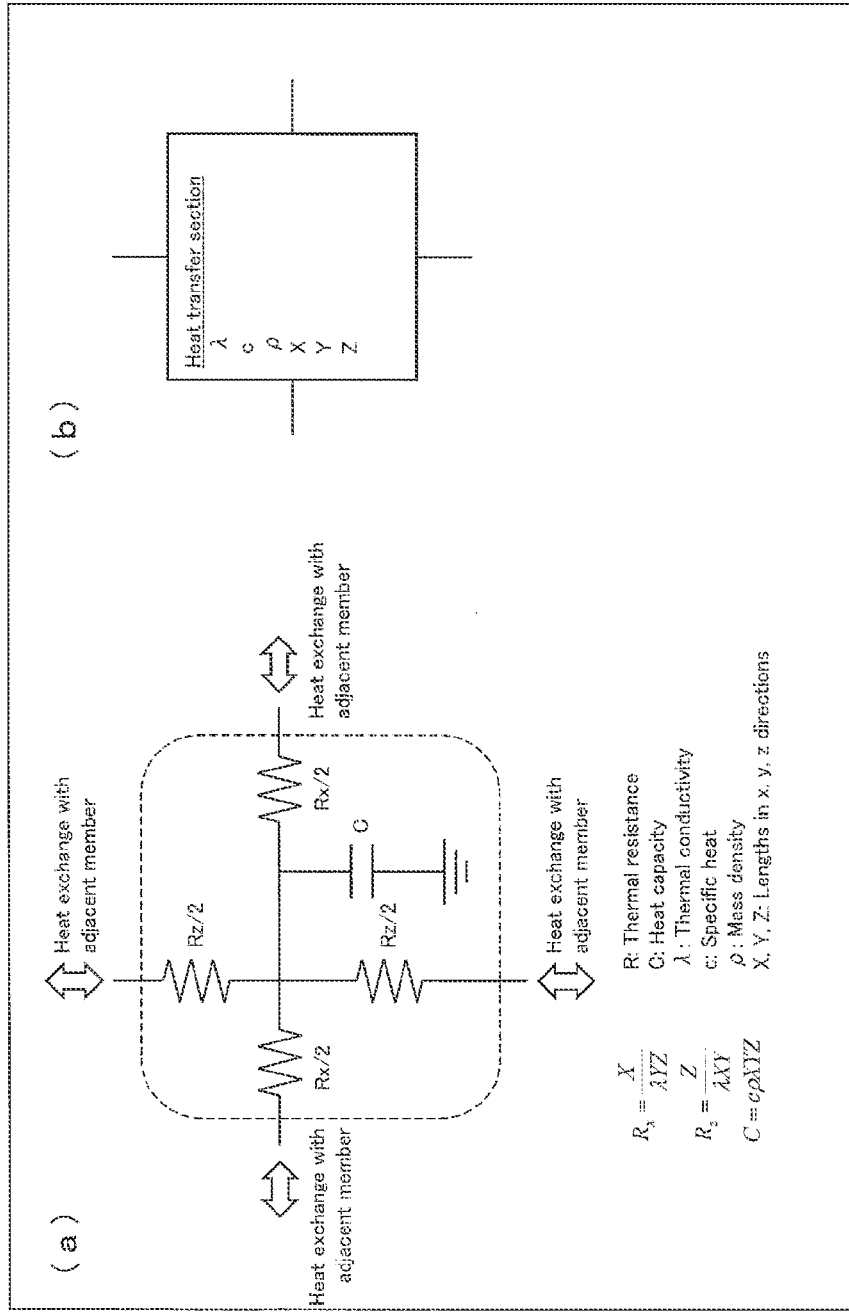

(a) of FIG. 13 is a circuit diagram illustrating an equivalent heat circuit that expresses heat transfer in two-dimensional directions in a heat transfer section, and (b) of FIG. 13 is a diagram schematically illustrating the equivalent heat circuit of (a) of FIG. 13 as a block.

Figure 14:
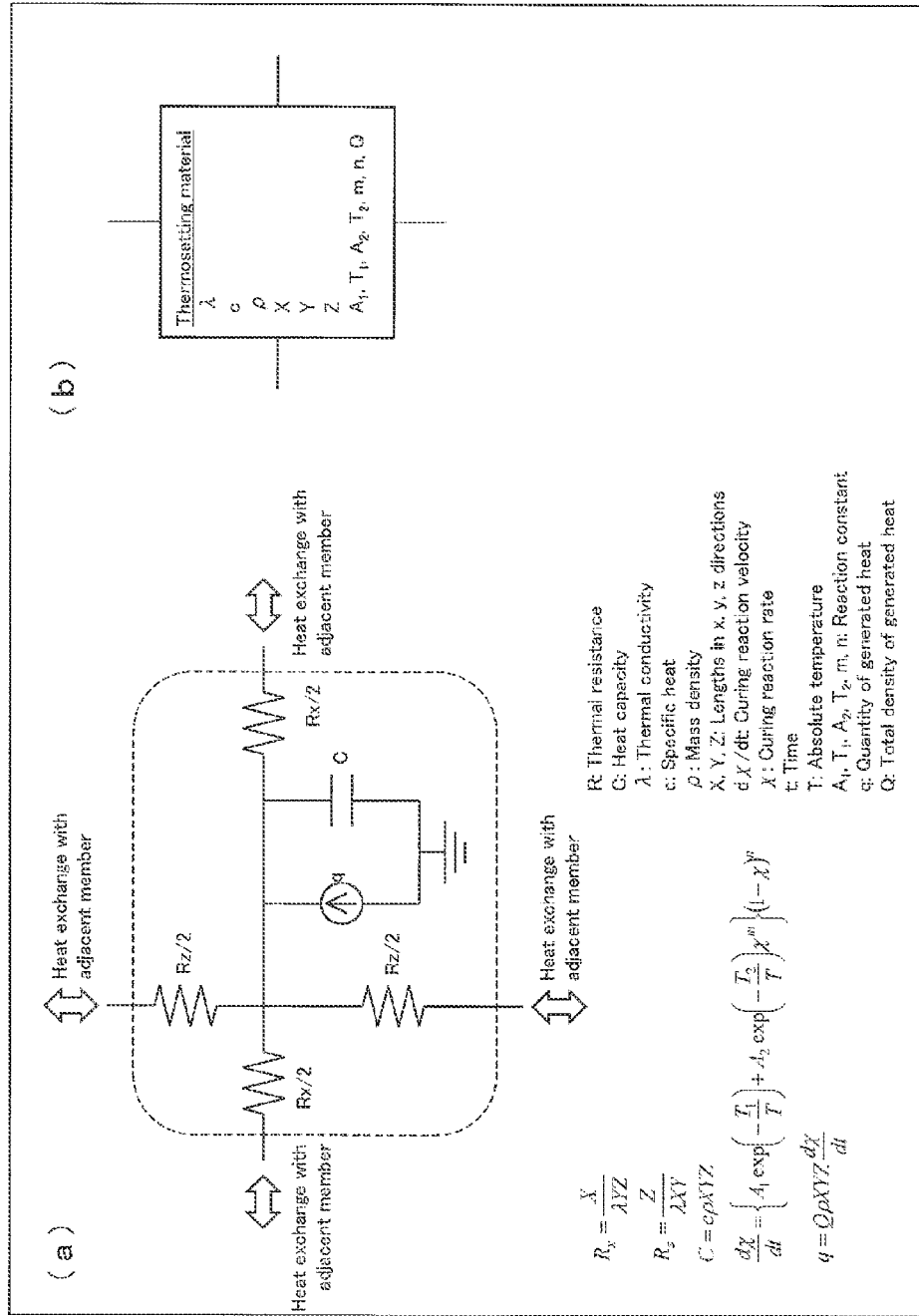

(a) of FIG. 14 is a circuit diagram illustrating an equivalent heat circuit that expresses heat generation and heat transfer in two-dimensional directions in a thermosetting material, and (b) of FIG. 14 is a diagram schematically illustrating the equivalent heat circuit of (a) of FIG. 14 as a block.

Figure 15:
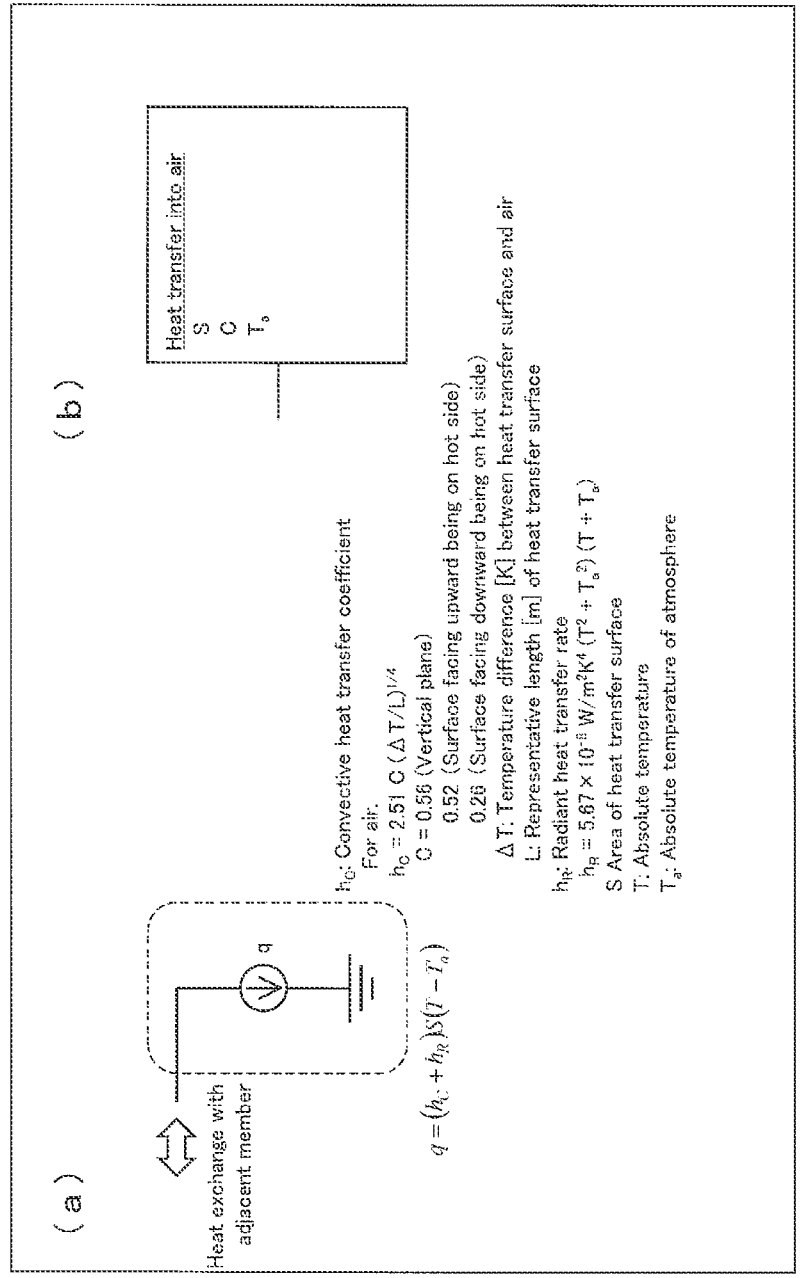

(a) of FIG. 15 is a circuit diagram illustrating an equivalent heat circuit that expresses dissipation of heat into air, and (b) of FIG. 15 is a diagram schematically illustrating the equivalent heat circuit of (a) of FIG. 15 as a block.

Figure 16:
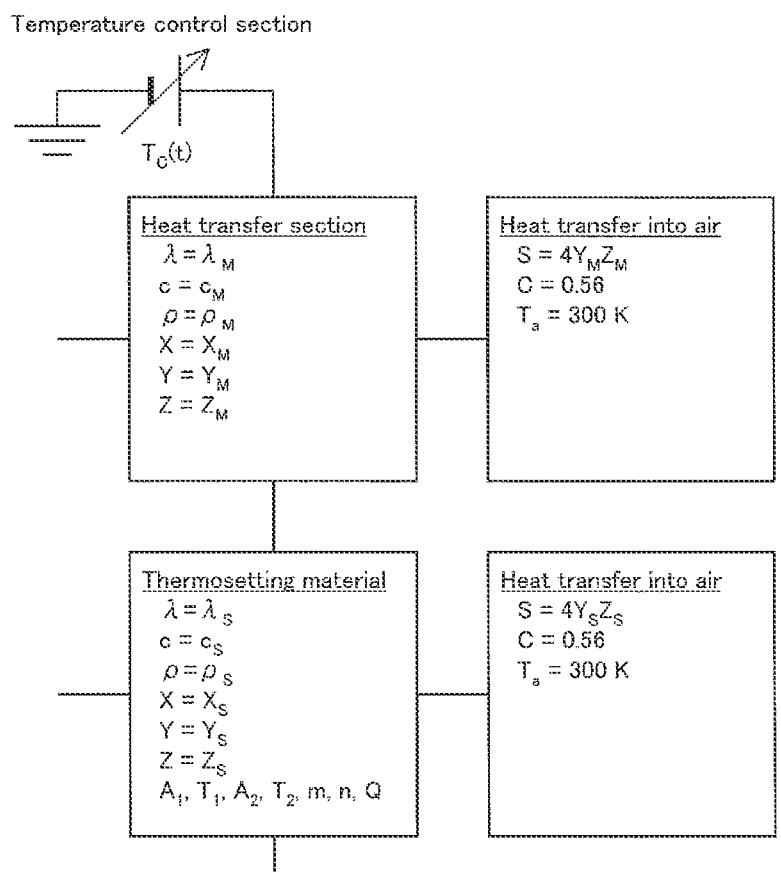

FIG. 16 is a diagram schematically illustrating, as blocks, an equivalent heat circuit that expresses heat generation and heat transfer in two-dimensional directions in a heat transfer section and a thermosetting material.

Figure 17:
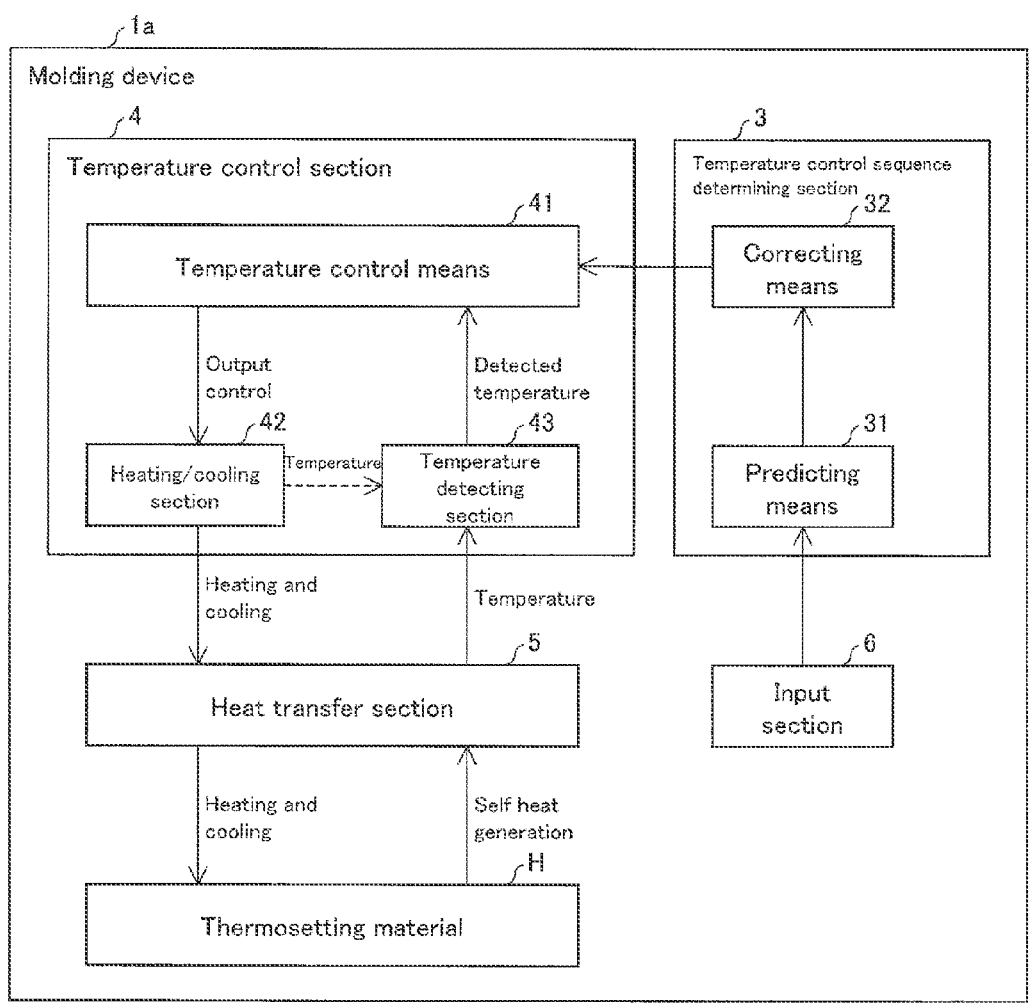

FIG. 17 is a block diagram schematically illustrating an arrangement of a molding device according to Embodiment 2.

Figure 18:
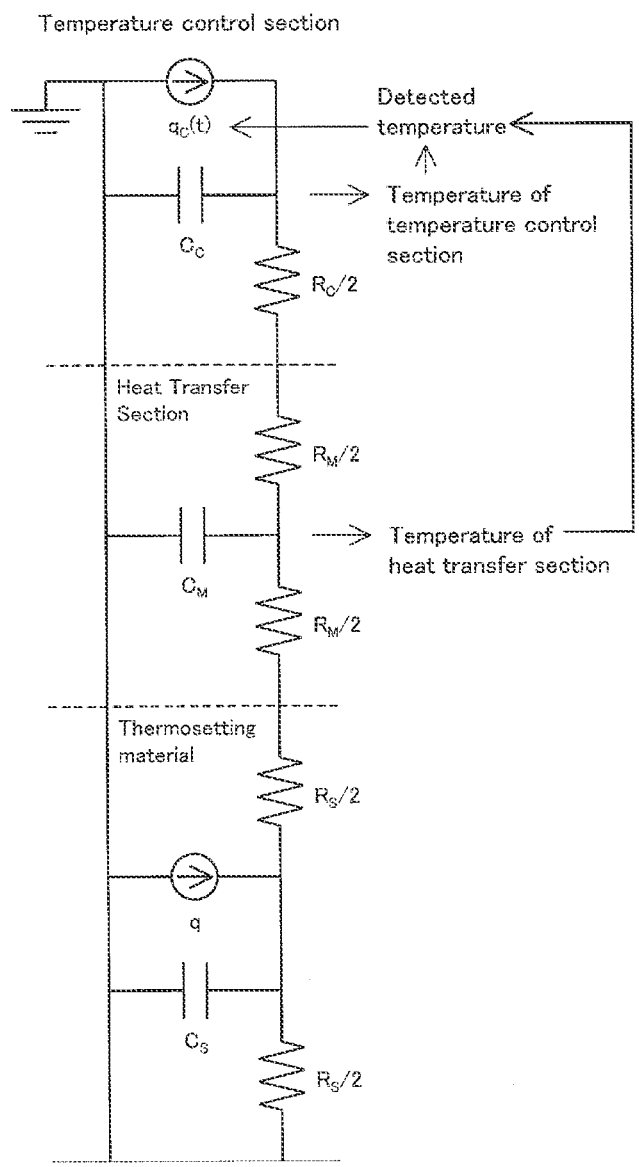

FIG. 18 illustrates an equivalent heat circuit that expresses heat generation and heat transfer in one-dimensional directions in a heat transfer section, a thermosetting material, and a temperature control section.

Figures 19, 20:
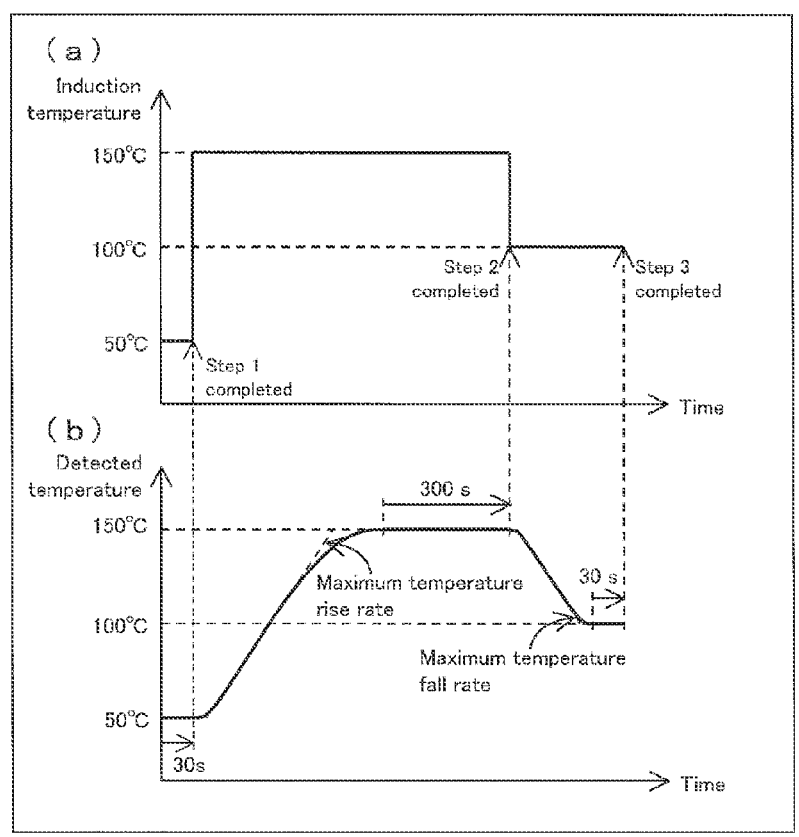

FIG. 19 is a table that defines an initial temperature control sequence.

(a) of FIG. 20 is a graph schematically illustrating a temperature change profile of induction temperature, the profile corresponding to the initial temperature control sequence shown in FIG. 19, and (b) of FIG. 20 is a graph schematically illustrating a temperature change profile of detected temperature as detected by a temperature detecting section.

Figures 21, 22:
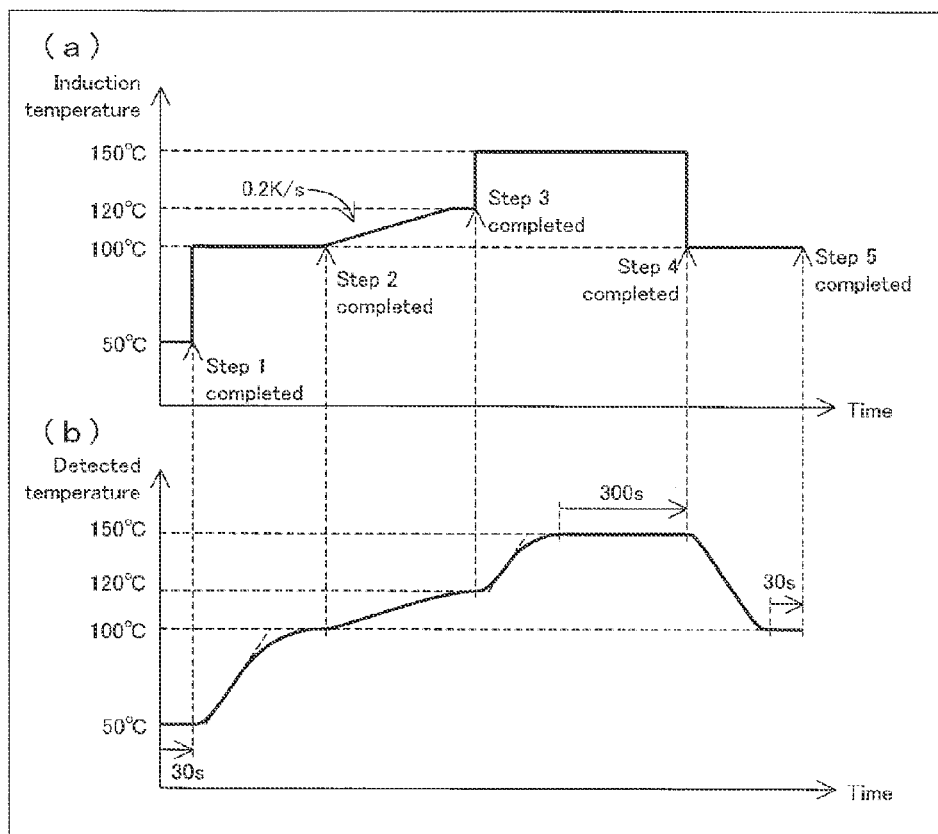

FIG. 21 is a table that defines a corrected temperature control sequence.

(a) of FIG. 22 is a graph schematically illustrating a temperature change profile of induction temperature, the profile corresponding to the corrected temperature control sequence shown in FIG. 21, and (b) of FIG. 22 is a graph schematically illustrating a temperature change profile of detected temperature as detected by a temperature detecting section.

Figures 23, 24:
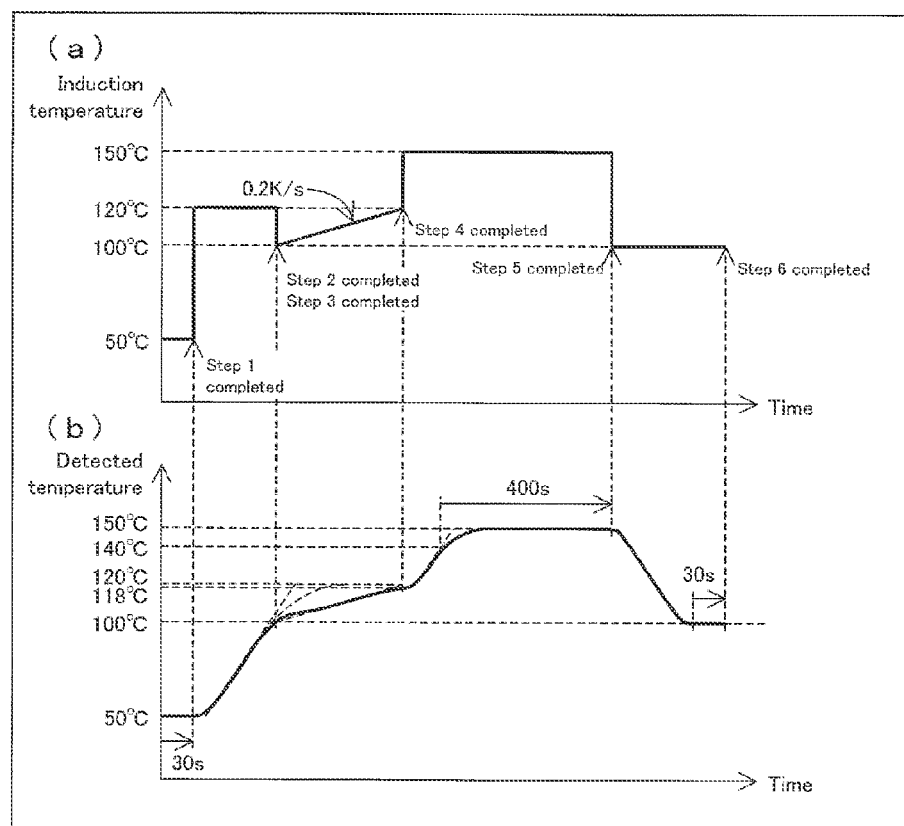

FIG. 23 is another table that defines a corrected temperature control sequence.

(a) of FIG. 24 is a graph schematically illustrating a temperature change profile of induction temperature, the profile corresponding to the corrected temperature control sequence shown in FIG. 23, and (b) of FIG. 24 is a graph schematically illustrating a temperature change profile of detected temperature as detected by a temperature detecting section.

Figure 25:
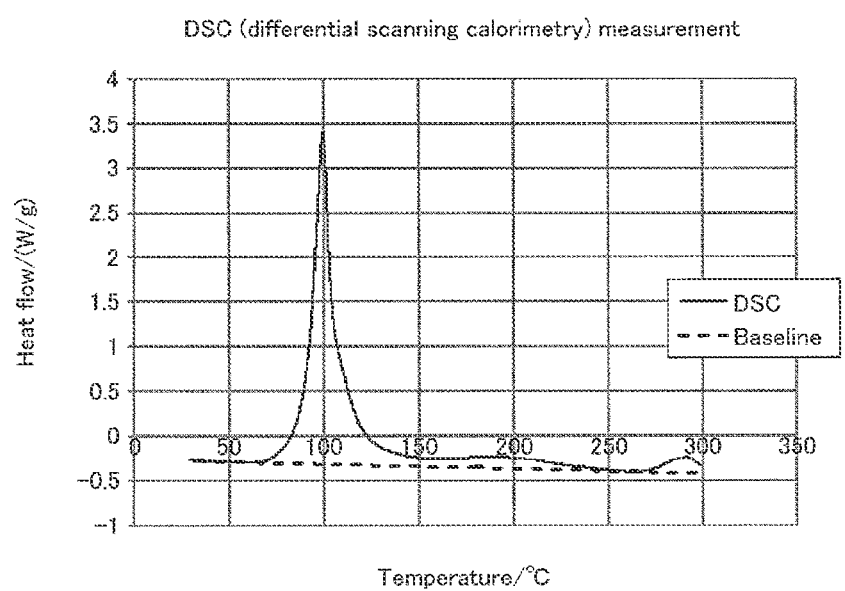

FIG. 25 is a graph illustrating an example of the temperature-dependence of a heat flow from a thermosetting material, the temperature-dependence having been observed through DSC measurement of the thermosetting material at a temperature rise rate of 10 K/minute.

Figure 26:
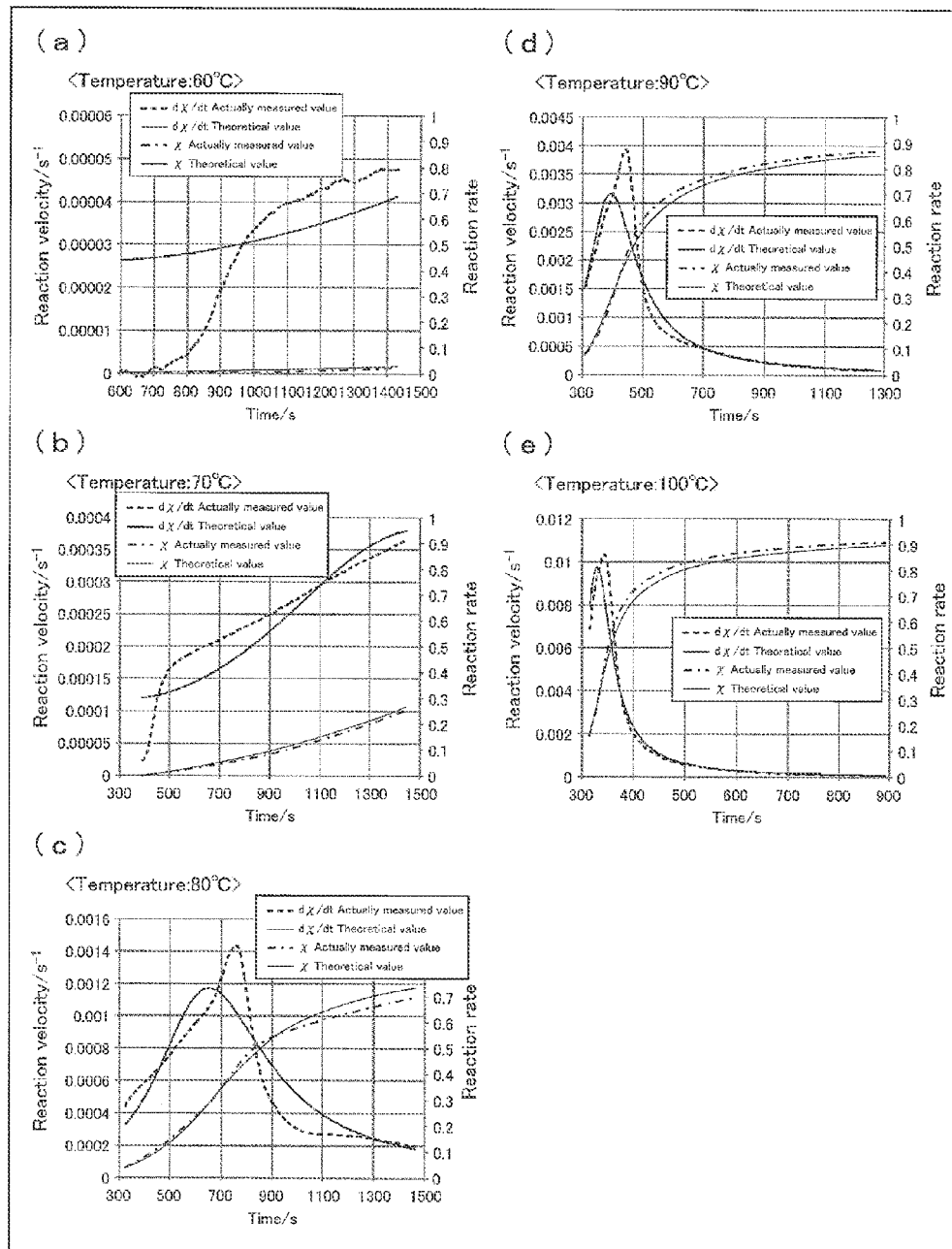

(a) through (e) of FIG. 26 are each a graph illustrating an example of a temporal change in curing reaction velocity and curing reaction rate both measured through isothermal DSC measurement of a sample at a constant temperature. (a) of FIG. 26 illustrates a temporal change in curing reaction velocity and curing reaction rate both measured through isothermal DSC measurement of a sample at a constant temperature of 60° C. (b) of FIG. 26 illustrates a temporal change in curing reaction velocity and curing reaction rate both measured through isothermal DSC measurement of a sample at a constant temperature of 70° C. (c) of FIG. 26 illustrates a temporal change in curing reaction velocity and curing reaction rate both measured through isothermal DSC measurement of a sample at a constant temperature of 80° C. (d) of FIG. 26 illustrates a temporal change in curing reaction velocity and curing reaction rate both measured through isothermal DSC measurement of a sample at a constant temperature of 90° C. (e) of FIG. 26 illustrates a temporal change in curing reaction velocity and curing reaction rate both measured through isothermal DSC measurement of a sample at a constant temperature of 100° C.

Figure 27:
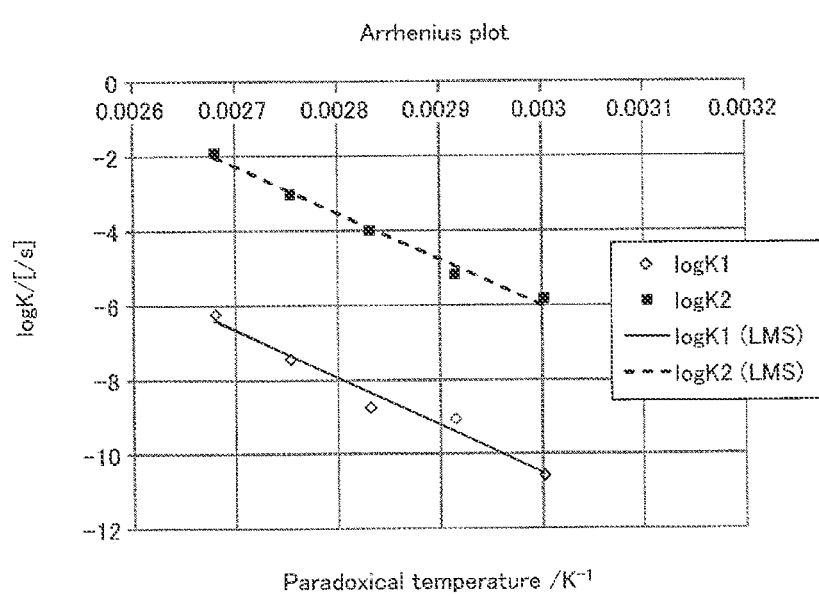

FIG. 27 is a graph illustrating an example Arrhenius plot.

Figure 28:
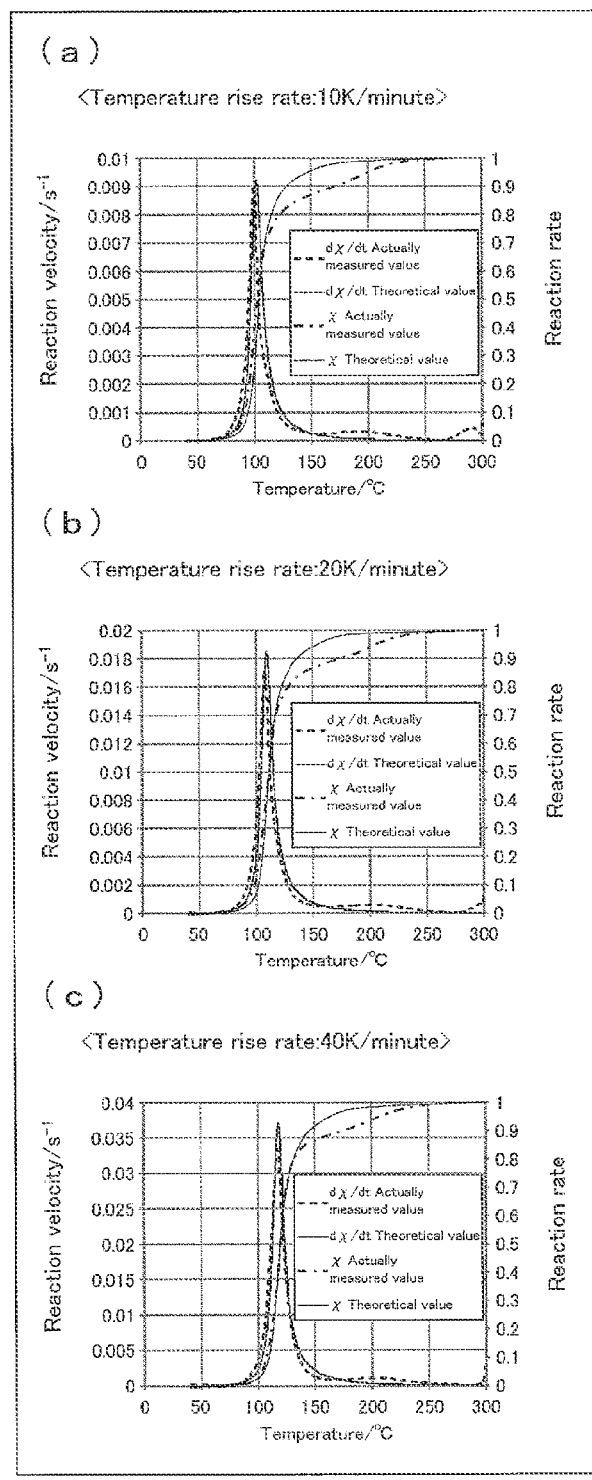

(a) through (c) of FIG. 28 are each a graph illustrating an example of how the curing reaction velocity and curing reaction rate of a sample change at a constant temperature rise rate. (a) of FIG. 28 illustrates how the curing reaction velocity and curing reaction rate of a sample change at a temperature rise rate of 10 K/minute. (b) of FIG. 28 illustrates how the curing reaction velocity and curing reaction rate of a sample change at a temperature rise rate of 20 K/minute. (c) of FIG. 28 illustrates how the curing reaction velocity and curing reaction rate of a sample change at a temperature rise rate of 40 K/minute.

FIG. 29 is a table that defines an initial temperature control sequence.

FIG. 30 is a graph schematically illustrating a temperature change profile for a temperature control section, the profile corresponding to the initial temperature control sequence shown in FIG. 29.

FIG. 31 is a graph illustrating the result of a thermal response simulation performed by predicting means.

FIG. 32 is a table that defines a corrected temperature control sequence.

FIG. 33 is a graph schematically illustrating a temperature change profile for a temperature control section, the profile corresponding to the corrected temperature control sequence shown in FIG. 32.

FIG. 34 is a graph illustrating the result of a thermal response simulation for the case in which the corrected temperature control sequence shown in FIG. 32 has been executed.

FIG. 35 is an example table that defines a temperature control sequence.

FIG. 36 is a table that shows an example variable group formed on the basis of the temperature control sequence shown in FIG. 35.

FIG. 37 is a table that shows example operand candidates.

FIG. 38 is an example table that defines a merit function.

Figure 39:
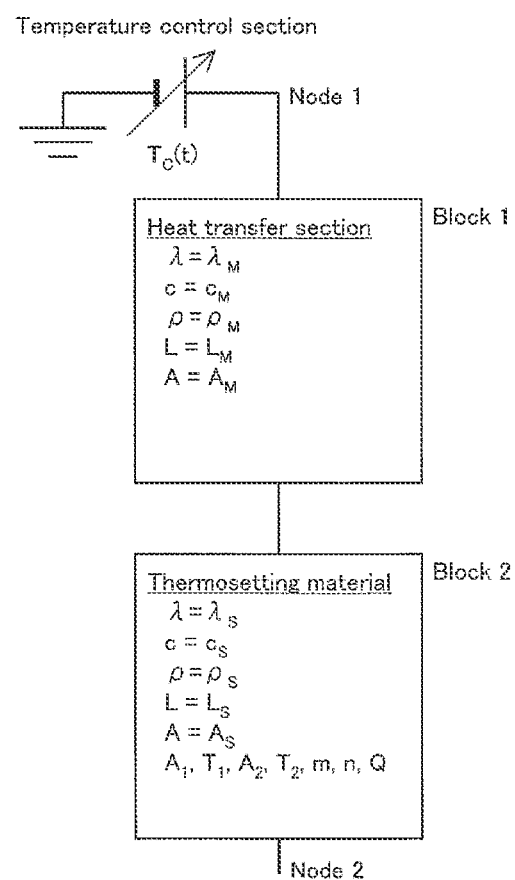

FIG. 39 is a circuit diagram illustrating an example equivalent heat circuit for describing the parameters shown in FIG. 38.

Figure 40:
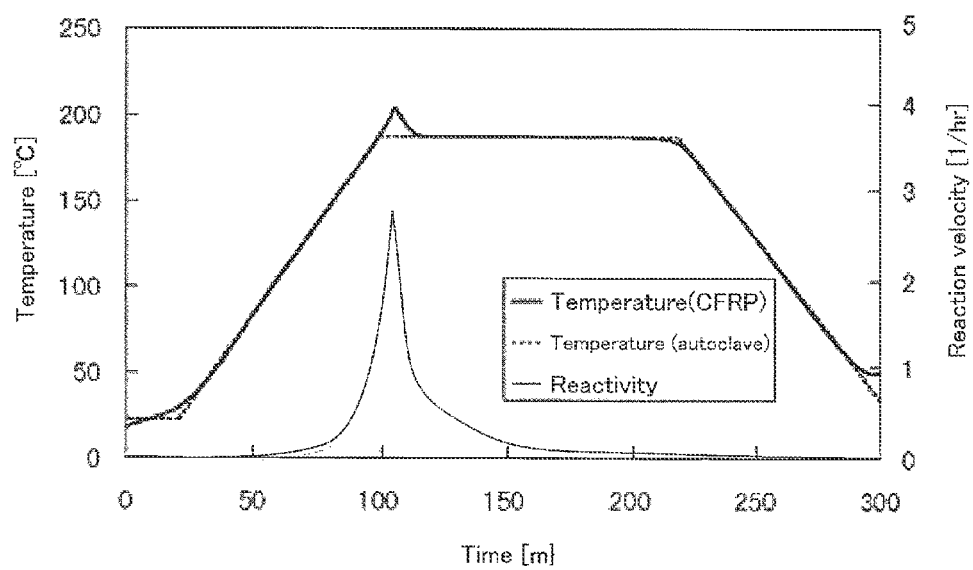

FIG. 40 is a graph for illustrating thermal runaway caused by excessive heating in a thermosetting material.

DESCRIPTION OF EMBODIMENTS

Embodiment 1

One embodiment of the present invention is described below with reference to FIGS. 1 through 16.

[1] Arrangement of a Molding Device 1

First, an arrangement of a molding device 1 according to the present embodiment is described with reference to FIG. 1.

Figure 1:
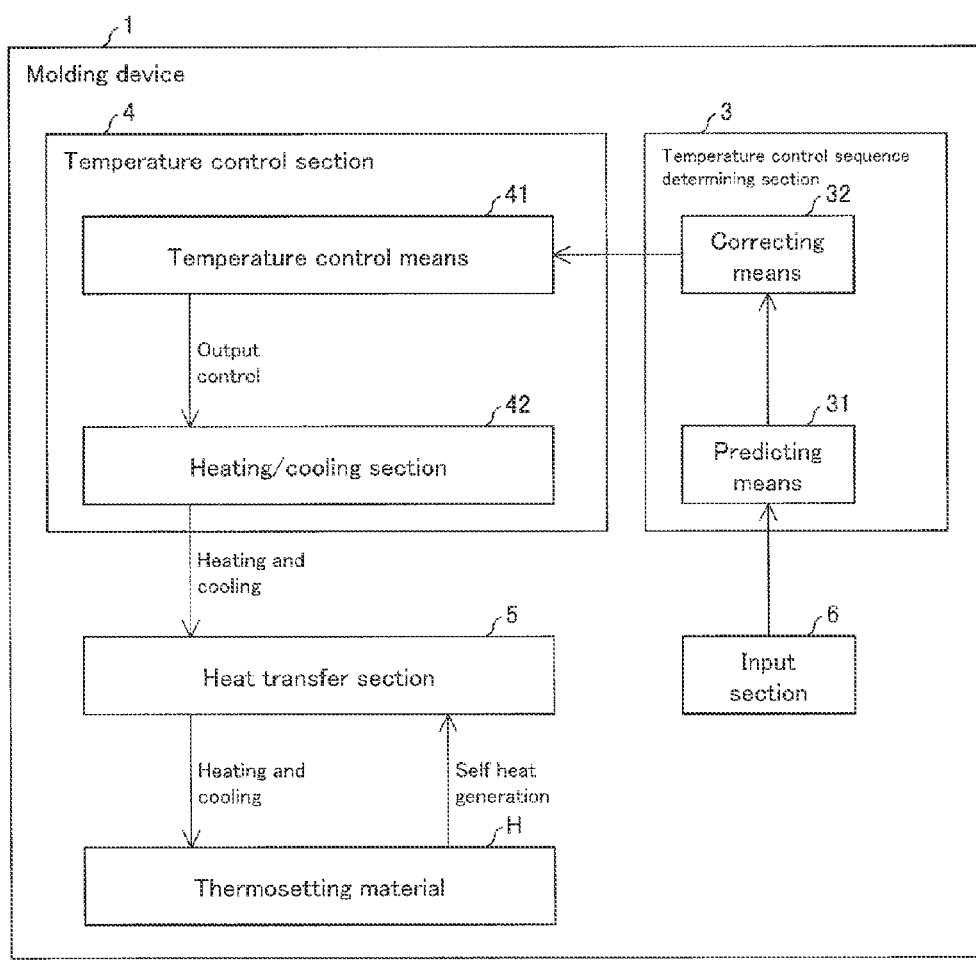
FIG. 1 is a block diagram schematically illustrating corresponding an arrangement of a molding device according to Embodiment 1.

FIG. 1 is a block diagram schematically illustrating an arrangement of a molding device 1 according to the present embodiment. The molding device 1 according to the present embodiment heats a molding targets (target object) made of a thermosetting material H, and molds the molding target by curing the thermosetting material H.

As illustrated in FIG. 1, the molding device 1 includes a temperature control sequence determining section (temperature control sequence determining device) 3, a temperature control section 4, a heat transfer section 5, and an input section 6.

(Temperature Control Sequence Determining Section 3)

The temperature control sequence determining section 3 predicts a temporal shift in temperature and curing reaction velocity of the thermosetting material H during a molding process, and corrects an initial temperature control sequence on the basis of a result of the prediction. The temperature control sequence determining section 3 includes predicting means 31 and correcting means 32.

(Predicting Means 31)

The predicting means 31 predicts a temporal shift in temperature and curing reaction velocity of the thermosetting material H during a molding process before the molding process is executed.

Specifically, the predicting means 31 simulates a temporal shift in temperature and curing reaction velocity of the thermosetting material H during a molding process as would be observed when a temperature control sequence (hereinafter referred to as "initial temperature control sequence"), given as an initial value, for specifying the operation of the temperature control section 4 is executed.

The predicting means 31 outputs a thermal response simulation result (see FIG. 9) of the prediction of a temporal shift in temperature and curing reaction velocity of the thermosetting material H, the initial temperature control sequence, and the like to the correcting means 32. A process in the predicting means 31 will be described in detail below.

(Correcting Means 32)

The correcting means 32 corrects the initial temperature control sequence on the basis of a thermal response simulation result of the prediction of a temporal shift in temperature and curing reaction velocity of the thermosetting material H as made by the predicting means 31. Specifically, upon receiving a thermal response simulation result from the predicting means 31, the correcting means 32 corrects the initial temperature control sequence on the basis of the thermal response simulation result so that the thermosetting material H is prevented from exhibiting thermal runaway due to excessive heating.

The correcting means 32 outputs the initial temperature control sequence thus corrected (hereinafter referred to as "corrected initial temperature control sequence") to the temperature control section 4. A process in the correcting means 32 will be described in detail below.

(Temperature Control Section 4)

The temperature control section 4 controls the temperature of the thermosetting material H. Specifically, the temperature control section 4 controls its own temperature on the basis of the temperature control sequence inputted. Then, the temperature control section 4 controls the temperature of the thermosetting material H by heating and cooling the thermosetting material H through the heat transfer section 5. That is, the temperature control section 4 controls the temperature of the thermosetting material H by having its own temperature controlled by a corrected temperature control sequence and heating and cooling the thermosetting material H through the heat transfer section 5. The temperature control section 4 includes a temperature control means 41 and a heating/cooling section 42.

The temperature control means 41 controls heating/cooling output from the heating/cooling section 42. Specifically, the temperature control means 41 controls heating/cooling output from the heating/cooling section 42 so that the heating/cooling section 42 shifts in temperature in accordance with the temperature control sequence inputted.

The heating/cooling section 42 operates for heating or cooling. Specifically, the heating/cooling section 42 heats or cool itself in accordance with an output signal from the temperature control means 41. The heating/cooling section 42 is composed of a heater such as a nichrome wire, cooling means such as a water-cooling pipe, a highly thermally-conducting metal plate, etc., and heats or cools the heat transfer section 5 by making contact with the heat transfer section 5. In the present embodiment, the metal plate is made of aluminum, with a thickness of about 30 mm.

(Heat Transfer Section 5)

The heat transfer section 5 exchanges heat with the thermosetting material H. The heat transfer section 5 is for example a mold made of a highly thermally-conducting metal. The heat transfer section 5 has its own temperature adjusted by the heating/cooling section 42, and exchanges heat with the thermosetting material H.

In the present embodiment, the heat transfer section 5 is made of SUS, with a thickness of about 20 mm and a thermal conductivity of about 20 W/K/m. The thicker the heat transfer section 5 is, the shorter delay time it takes for heat to be transferred to the thermosetting material H. The thinner the heat transfer section 5 is, the better is the in-plane uniformity of temperature of the thermosetting material H.

(Thermosetting Material H)

The thermosetting material H to be molded in the present embodiment for example has a thermal conductivity of about 0.2 W/K·m, a specific heat of about 1.5 J/K·g, a specific gravity of about 1.2 g/cm$^3$, and a thickness of about 0.8 mm. In the molding device 1, the heat transfer section 5 and the heating/cooling section 42 are symmetrically placed one above the other with the thermosetting material H therebetween. Therefore, in an equivalent heat circuit, the thickness of the thermosetting material H is 0.4 mm, and a point of contact of the thermosetting material H opposite the heat transfer section 5 is in a symmetrical boundary condition (heat flow=0).

[2] Process in the Predicting Means 31

Next, a process in the predicting means 31 is described in detail with reference to FIGS. 2 through 9.

As mentioned above, the predicting means 31 simulates a temporal shift in temperature and curing reaction velocity of the thermosetting material H during a molding process as would be observed when an initial temperature control sequence is executed. Specifically, the predicting means 31 simulates a temporal shift in temperature and curing reaction velocity of the thermosetting material H during a molding process by means of (1) through (3) below.

(1) DSC Measurement

DSC (differential scanning calorimetry) measurement is a method of measuring the quantity of heat generated by a sample at any time point with a constant temperature of the sample or during a continuous change in temperature of the sample. At a constant temperature rise rate, DSC measurement allows finding the total density of heat generated by the thermosetting material H.

Figure 2:
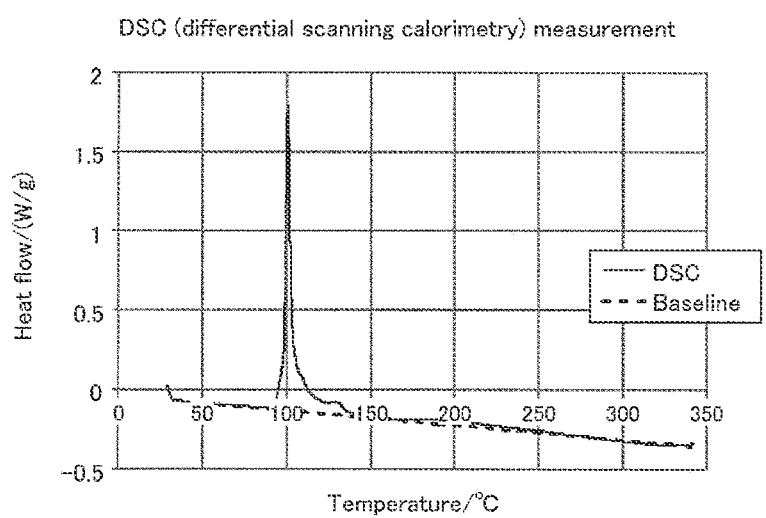
FIG. 2 is a graph illustrating an example of the temperature-dependence of a heat flow from a thermosetting material, the temperature-dependence having been observed through DSC measurement of the thermosetting material at a temperature rise rate of 5 K/minute.

FIG. 2 is a graph illustrating an example of the temperature-dependence of a heat flow from a thermosetting material H, the temperature-dependence having been observed through DSC measurement of the thermosetting material H at a temperature rise rate of 5 K/minute. The total density of heat generated in the thermosetting material H can be determined to be 160 J/g by, for instance, (i) setting, as a baseline, a line connecting two points (in FIG. 2, the point at 50° C. and the point at 280° C.) at each of which the quantity of heat generated in the thermosetting material H can be regarded as 0 and (ii) subtracting, from the baseline, the heat capacity of the thermosetting material H, heat consumption due to heat dissipation, and the like.

Further, the predicting means 31 calculates the curing reaction velocity of the thermosetting material H according to the following calculation formula (Kamal model formula):

$$\frac{d\chi}{dt} = \left\{A_1 \exp\left(-\frac{T_1}{T}\right) + A_2 \exp\left(-\frac{T_2}{T}\right)\chi^m\right\}(1-\chi)^n, \quad \text{[Math. 11]}$$

where $d\chi/dt$ is the curing reaction velocity of the thermosetting material H, $\chi$ is the curing reaction rate of the thermosetting material H, t is time, T is the absolute temperature of the thermosetting material H, and $A_1$, $T_1$, $A_2$, $T_2$, m, and n are reaction parameters peculiar to the thermosetting material H.

Furthermore, the predicting means 31 calculates the quantity of heat generated by the thermosetting material H according to the following calculation formula:

$$q = QM\frac{d\chi}{dt} \quad \text{[Math. 12]}$$

q: Quantity of heat generated by the thermosetting material H

Q: Total density of generated heat peculiar to the thermosetting material H

M: Mass of the thermosetting material H In order to find these reaction parameters, it is only necessary to compare results of DSC measurement at different temperature rise rates.

(a) of FIG. 3 is a graph illustrating a temporal change in reaction velocity as obtained through DSC measurement of a sample at a temperature rise rate of 5 K/min, and (b) of FIG. 3 is a graph illustrating a temporal change in reaction velocity as obtained through DSC measurement of a sample at a temperature rise rate of 10 K/min.

With attention focused on the position and height of an exothermic peak, the gradient of a rising of the exothermic peak, the gradient of a tail of exothermic peak, and the width of the exothermic peak, among these results of measurement, the reaction parameters are adjusted so that the difference between the actually measured value and the calculated value is small.

This is how the reaction parameter ($A_1$, $T_1$, $A_2$, $T_2$, m, and n) peculiar to the thermosetting material H can be found. Specifically, $A_1=2.8\times10^5$/s, $T_1=8000$ K, $A_2=1.2\times10^{14}$/s, $T_2=12600$ K, m=1.6, and n=3.2.

As mentioned above, the curing reaction velocity of the thermosetting material H can be expressed by the following calculation formula:

$$\frac{d\chi}{dt} = \left\{A_1 \exp\left(-\frac{T_1}{T}\right) + A_2 \exp\left(-\frac{T_2}{T}\right)\chi^m\right\}(1-\chi)^n \quad \text{[Math. 13]}$$

With a method for, in determining the reaction parameters, filling results of DSC measurement at a constant temperature rise rate, it is difficult to uniquely determine the reaction parameters, as the absolute temperature T as well as the curing reaction rate x changes. A method that involves the use of results of isothermal DSC measurement at a constant temperature will be described later.

(2) Equivalent Heat Circuit

Further, the predicting means 31 constitutes an equivalent heat circuit that equivalently expresses heat generation and heat transfer in the thermosetting material H, the heat transfer section 5, and the temperature control section 4 by using a combination selected from among a temperature source, a heat flow source, thermal resistance, and heat capacity.

In actuality, in the temperature control section 4 of the molding device 1, the temperature control means 41 usually controls the quantity of generated heat (i.e. acts as a heat flow source) by feedback control in order to guide the temperature of the heating/cooling section 42 to a desired temperature. However, for simplicity, the temperature control section 4 here is expressed as a temperature source that can directly set the temperature of the heating/cooling section 42.

The equivalent heat circuit is a heat circuit that equivalently or approximately expresses an assumed system by using a combination of a temperature source, a heat flow source, thermal resistance, and heat capacity. Heat transfer and heat generation phenomena can be handled by analogy with a conducting phenomenon of an electric circuit, and there are relationships of correspondence between temperature and electric potential, between a heat flow and an electric current, between thermal resistance/conductance and electric resistance/conductance, between heat capacity and electric capacity, and between a heat circuit and an electric circuit.

(a) of FIG. 4 is a circuit diagram illustrating an equivalent heat circuit that expresses the transfer of heat in one-dimensional directions in the heat transfer section 5, and (b) of FIG. 4 is a diagram schematically illustrating the equivalent heat circuit of (a) of FIG. 4 as a block.

As illustrated in (a) of FIG. 4 and (b) of FIG. 4, the transfer of heat in one-dimensional directions in the heat transfer section 5 can be represented by a combination of the thermal resistance R and the heat capacity C. In this case, the thermal resistance R and the heat capacity C are represented as follows, respectively:

$$R = \frac{L}{\lambda A}$$ [Math. 14]

$$C = c\rho A L$$

(a) of FIG. 5 is a circuit diagram illustrating an equivalent heat circuit that expresses the generation of heat in the thermosetting material H and the transfer of heat in one-dimensional directions in the thermosetting material H, and (b) of FIG. 5 is a diagram schematically illustrating the equivalent heat circuit of (a) of FIG. 5 as a block.

As illustrated in (a) of FIG. 5 and (b) of FIG. 5, the generation of heat in the thermosetting material H and the transfer of heat in one-dimensional directions in the thermosetting material H can be represented by a combination of thermal resistance R, the heat capacity C, and the quantity q of generated heat. In this case, the thermal resistance R, the heat capacity C, the curing reaction velocity $d\chi/dt$, and the quantity q of generated heat are represented as follows, respectively:

$$R = \frac{L}{\lambda A}$$ [Math. 15]

$$C = c\rho A L$$

$$\frac{d\chi}{dt} = \left\{ A_1 \exp\left(-\frac{T_1}{T}\right) + A_2 \exp\left(-\frac{T_2}{T}\right) \chi^m \right\} (1-\chi)^n$$

$$q = Q\rho A L \frac{d\chi}{dt}$$

(a) of FIG. 6 illustrates an equivalent heat circuit that expresses the generation of heat in the thermosetting material H and the temperature control section 4 and the transfer of heat in one-dimensional directions in the thermosetting material H and the temperature control section 4, and (b) of FIG. 6 is a diagram schematically illustrating the equivalent heat circuit of (a) of FIG. 6 as blocks.

As illustrated in (a) of FIG. 6 and (b) of FIG. 6, the equivalent heat circuit that expresses the generation and transfer of heat in the thermosetting material H and the temperature control section 4 is arranged such that the equivalent heat circuit of the heat transfer section 5 as illustrated in (a) of FIG. 4 and the equivalent heat circuit of the thermosetting material H as illustrated in (a) of FIG. 4 are connected, and can be represented by a combination of the thermal resistance R, the heat capacity C, the quantity q of generated heat, and the temperature source $T_C$ (which is equivalent to the temperature control section 4).

In this case, the thermal resistance $R_M$ and heat capacity $C_M$ of the heat transfer section 5 are represented as follows, respectively:

$$R_M = \frac{L_M}{\lambda_M A_M}$$ [Math. 16]

$$C_M = c_M \rho_M A_M L_M$$

Further, the thermal resistance $R_S$, heat capacity $C_S$, curing reaction velocity $d\chi/dt$, and the quantity q of heat generated by the thermosetting material H are represented as follows, respectively:

$$R_S = \frac{L_S}{\lambda_S A_S}$$ [Math. 17]

$$C_S = c_S \rho_S A_S L_S$$

$$\frac{d\chi}{dt} = \left\{ A_1 \exp\left(-\frac{T_1}{T}\right) + A_2 \exp\left(-\frac{T_2}{T}\right) \chi^m \right\} (1-\chi)^n$$

$$q = Q\rho_S A_S L_S \frac{d\chi}{dt}$$

(3) Initial Temperature Control Sequence

FIG. 7 is a table that defines the initial temperature control sequence. As illustrated in FIG. 7, the initial temperature control sequence is given various types of program that control the temperature. The initial temperature control sequence includes temperature control steps 1 to 3, and each of the temperature control steps is defined by a target temperature, a temperature change rate, and lapse time.

FIG. 8 is a graph schematically illustrating a temperature change profile for the temperature control section 4, the profile corresponding to the initial temperature control sequence shown in FIG. 7. In the case where the temperature control section 4 controls its own temperature on the basis of the corrected temperature control sequence shown in FIG. 7, the temperature of the temperature control section 4 shifts as in the temperature change profile illustrated in FIG. 8.

The purpose of allowing a longer retention time of 300 seconds at 150° C. in the temperature control step 2 of the initial temperature control sequence is to stabilize the molding precision of the molding target by stress relaxation. This initial temperature control sequence may be inputted by the user via the input section 6, or may be stored in advance in the molding device 1.

(4) Thermal Response Simulation

The predicting means 31 calculates respective temporal shifts of the curing reaction rate $\chi$, curing reaction velocity $d\chi/dt$, and absolute temperature T of a thermosetting material H through a thermal response simulation on the basis of the reaction parameters, equivalent heat circuit, and initial temperature control sequence such as those described above.

FIG. 9 is a graph illustrating the result of a thermal response simulation performed by the predicting means 31. The result of the thermal response simulation performed by the predicting means 31 shows that as illustrated in FIG. 9, executing the initial temperature control sequence may cause the curing reaction velocity of the thermosetting material H to increase drastically at around 130 seconds and consequently cause thermal runaway in the thermosetting material H as a result of the excessive heating.

The result of the thermal response simulation shows that the thermosetting material H has (i) an excessive temperature rise with a maximum value of 11.7 K, (ii) a curing reaction velocity with a maximum value of 0.609 per second, and (iii) a final curing reaction rate of 0.983.

[3] Process in the Correcting Means 32

Next, a process in the correcting means 32 is described in detail with reference to FIGS. 10 through 12.

As mentioned above, the correcting means 32 corrects, on the basis of the result of a thermal response simulation performed by the predicting means 31 to predict a temporal shift in temperature and curing reaction velocity of a thermosetting material H, an initial temperature control sequence to prevent excessive heating from causing thermal runaway in the thermosetting material H.

In order to prevent the thermosetting material H from exhibiting thermal runaway due to excessive heating, it is only necessary to lower the temperature rise rare during heating. In order to avoid taking too a long time for the molding process, it is preferable to apply a low temperature rise rate only in part of the process. Due to the factors "$\chi^m$" and "$(1-\chi)^n$" of the curing reaction velocity formula, the curing reaction progresses at an accelerated rate especially in the first half (curing reaction rate 0.05 to 0.2) of the curing reaction. Therefore, it is effective to apply a low temperature rise rate in the first half of the curing reaction.

FIG. 10 is a table that defines a corrected temperature control sequence. As shown in FIG. 10, the correcting means 32 corrects an initial temperature sequence by subdividing the temperature control steps and setting a temperature change rate to decrease the temperature rise rate in the temperature range in which thermal runaway in the thermosetting material H is predicted in the result of a thermal response simulation performed by the predicting means 31.

FIG. 11 is a graph schematically illustrating a temperature change profile for the temperature control section 4, the profile corresponding to the corrected temperature control sequence shown in FIG. 10. FIG. 12 is a graph illustrating the result of a thermal response simulation for the case in which the corrected temperature control sequence shown in FIG. 10 has been executed.

In the case where the temperature control section 4 controls its own temperature on the basis of the corrected temperature control sequence shown in FIG. 32, the temperature of the temperature control section 4 shifts as in the temperature change profile illustrated in FIG. 33. The temperature control section 4 thus has a decreased temperature rise rate in the temperature range in which thermal runaway in the thermosetting material H is predicted in the result of a thermal response simulation performed by the predicting means 31. The correcting means 32 of the present embodiment has decreased the temperature change rate from 1.0 K/s to 0.2 K/s in a temperature range of 110° C. to 130° C., the temperature range covering (i) the temperature of 114.7° C., at which the curing reaction rate is 0.1, and (ii) the temperature of 124.7° C., at which the curing reaction rate is 0.2.

Consequently, executing the corrected temperature control sequence can prevent, as illustrated in FIG. 34, excessive heating from causing thermal runaway in a thermosetting material H. In the case where the temperature control section 4 controls its own temperature on the basis of the corrected temperature control sequence, the thermosetting material H has (i) an excessive temperature rise with a maximum value of 0.0 K, (ii) a curing reaction velocity with a maximum value of 0.100 per second, and (iii) a final curing reaction rate of 0.984.

Therefore, the molding device 1 according to the present embodiment makes it possible for the temperature control section 4 to start controlling its own temperature on the basis of the corrected temperature control sequence.

The present embodiment makes it possible to achieve a molding device 1 which prevents the thermosetting material H from exhibiting thermal runaway in the molding process and which prevents a molded article from suffering from physical property unevenness, a deformation, residual stress, a strength decrease.

It is preferable that the correcting means 32 correct the initial temperature control sequence so that the difference between the temperature of the thermosetting material H and the temperature of the temperature control section 4 (heating/cooling section 42) is not greater than 10° C. at any time point. This prevents a sudden increase in curing reaction velocity of the thermosetting material H, thus making it possible to prevent thermal runaway.

Further, it is preferable that the correcting means 32 correct the initial temperature control sequence so that the curing reaction velocity of the thermosetting material H is not greater than 0.1 per second at any time point. This makes it possible to effectively prevent the thermosetting material H from exhibiting thermal runaway.

Further, it is preferable that the correcting means 32 correct the initial temperature control sequence so that the curing reaction rate of the thermosetting material H is not less than 0.8 at a time point at which the initial temperature control sequence is completed. This makes it possible to increase the curing reaction rate of the thermosetting material H at the time of completion of the molding process.

[4] Variations of Equivalent Heat Circuits

Next, variations of equivalent heat circuits are described with reference to FIGS. 13 through 16.

The foregoing description has been given of a case where the predicting means 31 uses one-dimensional equivalent heat circuits to simulate a temporal shift in temperature and curing reaction velocity of the thermosetting material H during a molding process. However, the present invention is not limited to such a case. Instead of the one-dimensional equivalent heat circuit, a two-dimensional equivalent heat circuit may be used to run a thermal response simulation.

(a) of FIG. 13 is a circuit diagram illustrating an equivalent heat circuit that expresses the transfer of heat in two-dimensional directions in the heat transfer section 5, and (b) of FIG. 13 is a diagram schematically illustrating the equivalent heat circuit of (a) of FIG. 13 as a block.

As illustrated in (a) of FIG. 13 and (b) of FIG. 13, the transfer of heat in two-dimensional directions in the heat transfer section 5 can be represented by a combination of the thermal resistance $R_X$, the thermal resistance $R_Z$, and the heat capacity C. In this case, the thermal resistance $R_X$, the thermal resistance $R_Z$, and the heat capacity C are represented as follows, respectively:

$$R_x = \frac{X}{\lambda YZ}$$ [Math. 18]

$$R_z = \frac{Z}{\lambda XY}$$

$$C = c\rho XYZ$$

(a) of FIG. 14 is a circuit diagram illustrating an equivalent heat circuit that expresses the generation of heat in the thermosetting material H and the transfer of heat in two-dimensional directions in the thermosetting material H, and (b) of FIG. 14 is a diagram schematically illustrating the equivalent heat circuit of (a) of FIG. 14 as a block.

As illustrated in (a) of FIG. 14 and (b) of FIG. 14, the generation of heat in the thermosetting material H and the transfer of heat in two-dimensional directions in the thermosetting material H can be represented by a combination of the thermal resistance $R_X$, the thermal resistance $R_Z$, the heat capacity C, and the quantity q of generated heat. In this case, the thermal resistance $R_X$, the thermal resistance $R_Z$, the heat capacity C, the curing reaction velocity $d\chi/dt$, and the quantity q of generated heat are represented as follows, respectively:

$$R_x = \frac{X}{\lambda YZ}$$ [Math. 19]

$$R_z = \frac{Z}{\lambda XY}$$

$$C = c\rho XYZ$$

$$\frac{d\chi}{dt} = \left\{A_1\exp\left(-\frac{T_1}{T}\right) + A_2\exp\left(-\frac{T_2}{T}\right)\chi^m\right\}(1-\chi)^n$$

$$q = Q\rho XYZ\frac{d\chi}{dt}$$

(a) of FIG. 15 is a circuit diagram illustrating an equivalent heat circuit that expresses dissipation of heat into air, and (b) of FIG. 15 is a diagram schematically illustrating the equivalent heat circuit of (a) of FIG. 15 as a block.

As illustrated in (a) of FIG. 15 and (b) of FIG. 15, the dissipation of heat into air can be represented by the quantity q of generated heat. In this case, the quantity q of generated heat can be represented as follows:

$$q = (h_C + h_R)S(T - T_a), \quad [\text{Math. 20}]$$

where $h_C$ is the convective heat transfer rate, $h_S$ is the radiant heat transfer rate, S is the area of a heat transfer surface (surface in contact with air), and $T_a$ is the air temperature.

$h_C$ and $h_S$ are calculated according to the formula shown in FIG. 15.

FIG. 16 is a diagram schematically illustrating, as blocks, an equivalent heat circuit that expresses the generation of heat in the thermosetting material H and the temperature control section 4 and the transfer of heat in two-dimensional directions in the thermosetting material H and the temperature control section 4. As illustrated in FIG. 16, the equivalent heat circuit that expresses the generation and transfer of heat in the thermosetting material H and the temperature control section 4 can be represented by a combination of a block of an equivalent heat circuit of the heat transfer section 5, a block of an equivalent heat circuit of the thermosetting material H, a block of an equivalent heat circuit that expresses dissipation of heat into air, and the temperature source Tc (which is equivalent to the temperature control section 4).

Use of such two-dimensional equivalent heat circuits makes it possible to analyze a more complicated system. For example, for a structure of rotation symmetry, heat circuits can be arranged by using cylinder coordinates.

Use of three-dimensional equivalent heat circuits makes it possible to perform a more realistic analysis, but makes an arrangement of equivalent heat circuits complicated. Therefore, such an arrangement is not illustrated here.

Embodiment 2

The description below deals with another embodiment of the present invention with reference to FIGS. 17 through 24. For convenience of explanation, members of the present embodiment that are identical in function to their respective corresponding members described in the above embodiments with reference to drawings are each assigned an identical reference sign, and are not described here.

[1] Arrangement of a Molding Device 1a

First, an arrangement of a molding device 1a according to the present embodiment is described with reference to FIG. 17. FIG. 17 is a block diagram schematically illustrating an arrangement of a molding device 1a according to the present embodiment. The molding device 1a according to the present embodiment differs from the molding device 1 according to Embodiment 1 mainly in that the temperature control section 4 includes a temperature detecting section (detecting section) 43 and that feedback control of the heating/cooling section 42 is performed in accordance with the temperature of the heat transfer section 5 as detected by the temperature detecting section 43.

(Temperature Detecting 43)

The temperature detecting section 43 detects the temperature of at least either the heat transfer section 5 or the heating/cooling section 42. In the present embodiment, the temperature detecting section 43 detects the temperature of the heat transfer section 5, and outputs the temperature of the heat transfer section 5 thus detected to the temperature control means 41.

(Temperature Control Means 41)

The temperature control means 41 controls heating/cooling output from the heating/cooling section 42. In the present embodiment, the temperature control means 41 performs feedback control on the heating/cooling section 42 in accordance with a temperature control sequence inputted thereto and the temperature (detected temperature) of the heat transfer section 5 as detected by the temperature detecting section 43, in order that the detected temperature gets closer to an induction temperature. That is, the temperature control means 41 employs a feedback control method such as PID with the heating/cooling section 42 as an actuator, with the heating/cooling output from the heating/cooling section 42 as control input, and with the detected temperature as a target of control.

It should be noted that possible upper limits on the temperature rise rate and temperature fall rate of the heating/cooling section 42 depend on the maximum capacity of the heating/cooling output from the heating/cooling section 42.

[2] Process in the Predicting Means 31

Next, a process in the predicting means 31 is described in detail with reference to FIG. 18.

As mentioned above, the predicting means 31 simulates a temporal shift in temperature and curing reaction velocity of the thermosetting material H during a molding process by means of DSC measurement, an equivalent heat circuit, and an initial temperature control sequence.

FIG. 18 is a circuit diagram illustrating an equivalent heat circuit that expresses the generation of heat in the heat transfer section 5, the thermosetting material H, and the temperature control section 4 and the transfer of heat in one-dimensional directions in the heat transfer section 5, the thermosetting material H, and the temperature control section 4. In the present embodiment, the temperature control means 41 controls the quantity of generated heat by feedback control in order to induce the temperature of the heat transfer section 5 to be the desired temperature. Therefore, in the equivalent heat circuit, as shown in FIG. 18, the temperature control section 4 is expressed as a heat flow source.

[3] Process in the Correcting Means 32

Next, a process in the correcting means 32 is described in detail with reference to FIGS. 19 through 24.

FIG. 19 is a table that defines the initial temperature control sequence. As illustrated in FIG. 19, the initial temperature control sequence is given various types of program that control the temperature. The initial temperature control sequence includes temperature control steps 1 to 3, and each of the temperature control steps is defined by a target temperature, a trigger temperature, and lapse time.

Each of the temperature control steps is completed after the lapsed time has elapsed since the detected temperature reached the trigger temperature. Further, a temperature control step that is not given a trigger temperature is completed after the lapse time has elapsed since the step was started.

(a) of FIG. 20 is a graph schematically illustrating a temperature change profile of induction temperature, the profile corresponding to the initial temperature control sequence shown in FIG. 19, and (b) of FIG. 20 is a graph schematically illustrating a temperature change profile of detected temperature as detected by the temperature detecting section 43. In the graph of induction temperature, as illustrated in (a) of FIG. 20, there are changes in steps in target temperature. On the other hand, as illustrated in (b) of FIG. 20, after a delay time, the detected temperature approaches the induction temperature with the aforementioned upper limits on the temperature rise rate and the temperature fall rate, and in the vicinity of the induction temperature, there are further decreases in the temperature rise rate and temperature fall rate for convergence.

In order to prevent the thermosetting material H from exhibiting thermal runaway due to excessive heating, the correcting means 32 corrects the initial temperature control sequence to decrease the temperature rise rate during heating.

FIG. 21 is a table that defines a corrected temperature control sequence. As illustrated in FIG. 21, the correcting means 32 corrects the initial temperature control sequence by subdividing the temperature control steps and setting a temperature change rate to decrease the temperature rise rate during heating.

(a) of FIG. 22 is a graph schematically illustrating a temperature change profile of induction temperature, the profile corresponding to the corrected temperature control sequence shown in FIG. 21, and (b) of FIG. 22 is a graph schematically illustrating a temperature change profile of detected temperature as detected by the temperature detecting section 43.

In a case where the temperature control section 4 is controlled in accordance with the corrected temperature control sequence shown in FIG. 21, the induction temperature in STEP NO. 3 is 0.2 K/s as shown in (a) of FIG. 22. Therefore, as shown in (b) of FIG. 22, the temperature rise rate in detected temperature during heating becomes lower. Accordingly, as shown in (b) of FIG. 22, by executing the corrected temperature control sequence, the thermosetting material H can be prevented from exhibiting thermal runaway due to excessive heating.

However, as illustrated in (a) of FIG. 22 and (b) of FIG. 22, the control of temperature of the heat transfer section 5 in accordance with the corrected temperature control sequence shown in FIG. 21 requires convergence time for each transition from one temperature control step to another, thus undesirably prolonging the molding process. Further, since the convergence time varies depending on the surrounding environment (air temperature, coolant temperature, etc.), the molding process conditions vary from molding shot to molding shot, which becomes a factor for variation in molding accuracy.

It is therefore preferable that the correcting means 32 correct the initial temperature control sequence in such a manner as to avoid convergence time at a transition from one temperature control step to another by setting a trigger temperature that is different from the target temperature and to thereby shorten the duration of the molding process.

FIG. 23 is another table that defines a corrected temperature control sequence. As illustrated in FIG. 23, the correcting means 32 corrects the initial temperature sequence by subdividing the temperature control steps and setting a temperature change rate to decrease the temperature rise rate during heating and by setting a trigger temperature that is different from the target temperature.

(a) of FIG. 24 is a graph schematically illustrating a temperature change profile of induction temperature, the profile corresponding to the corrected temperature control sequence shown in FIG. 23, and (b) of FIG. 24 is a graph schematically illustrating a temperature change profile of detected temperature as detected by the temperature detecting section 43.

In a case where the temperature control section 4 is controlled in accordance with the corrected temperature control sequence shown in FIG. 23, as illustrated in (a) of FIG. 24 and (b) of FIG. 24, setting trigger temperatures that are different from the target temperatures makes it possible to proceed to the next step before the temperature rise rate and the temperature fall rate decrease for convergence and therefore shorten the duration of the molding process. Further, the absence of a decrease in the temperature rise rate and the temperature fall rate during the transition from one temperature control step to another makes it possible to reduce variation in timing of the transition from one temperature control step which variation arises due to the surrounding environment (air temperature, coolant temperature, etc.), to uniformize the process conditions for each molding shot, and to reduce variation in molding accuracy.

On the assumption that the temperature of the thermosetting material H at a time point at which the curing reaction rate of the thermosetting material H has a value within a range of 0.05 to 0.2 is the gelation temperature, it is preferable that the correcting means 32 correct the initial temperature control sequence by dividing a temperature control step, among the temperature control steps, whose duration includes a time point at which the temperature control section 4 is at the gelation temperature into two temperature control steps at a time point prior to the time point at which the temperature control section 4 is at the gelation temperature. By thus dividing a temperature control step to shorten the duration of a temperature control step that covers the gelation temperature, at which the curing reaction progresses at the most accelerated pace because of the characteristics of the reaction velocity formula, the period of time during which the temperature rise rate is low can be shortened.

Further, on the assumption that the temperature of the thermosetting material H at a time point at which the curing reaction rate of the thermosetting material H has a value within a range of 0.05 to 0.2 is the gelation temperature, it is preferable that the correcting means 32 correct the initial temperature control sequence by dividing a temperature control step, among the temperature control steps, whose duration includes a time point at which the temperature control section 4 is at the gelation temperature into two temperature control steps at a time point subsequent to the time point at which the temperature control section 4 is at the gelation temperature. By thus dividing a temperature control step to shorten the duration of a temperature control step that covers the gelation temperature, at which the curing reaction progresses at the most accelerated pace because of the characteristics of the reaction velocity formula, the period of time during which the temperature rise rate is low can be shortened.

Further, it is preferable that for a temperature control step, among the temperature control steps, whose duration includes a time point at which the temperature control section 4 is at the gelation temperature, the correcting means 32 correct initial temperature control sequence by, in a case where the temperature control step is not given a temperature change rate, giving the temperature control step a value lower than a limit value imposed by the heating capability of the temperature control means or by, in a case where the temperature control step is given a temperature change rate, lowering the temperature change rate. This makes it possible to lower the temperature rise rate of the thermosetting material H in a temperature control step whose duration includes a time point at which the temperature control section 4 is at the gelation temperature, thus making it possible to easily prevent the thermosetting material H from exhibiting thermal runaway.

Further, it is preferable that for a temperature control step, among the temperature control steps, whose duration includes a time point at which the temperature control section 4 is at the gelation temperature, the correcting means 32 correct temperature control sequence by lowering the target temperature. This makes it possible to lower the temperature rise rate of the thermosetting material H in a temperature control step whose duration includes a time point at which the temperature control section 4 is at the gelation temperature, thus making it possible to easily prevent the thermosetting material H from exhibiting thermal runaway.

Embodiment 3

The description below deals with another embodiment of the present invention with reference to FIGS. 25 through 34. For convenience of explanation, members of the present embodiment that are identical in function to their respective corresponding members described in the above embodiments with reference to drawings are each assigned an identical reference sign, and are not described here.

The present embodiment differs from Embodiment 1 mainly in that it determines reaction parameters through isothermal DSC measurement.

[1] Determining Total Density of Generated Heat Through DSC Measurement Based on Constant Temperature Rise Rate FIG. 25 is a graph illustrating an example of the temperature-dependence of a heat flow from a thermosetting material H, the temperature-dependence having been observed through DSC measurement of the thermosetting material H at a temperature rise rate of 10 K/minute. The total density of heat generated in the thermosetting material H can be determined to be 410 J/g by, for instance, (i) setting, as a baseline, a line connecting two points (in FIG. 25, the point at 50° C. and the point at 265° C.) at each of which the quantity of heat generated in the thermosetting material H can be regarded as 0 and (ii) subtracting, from the baseline, the heat capacity of the thermosetting material H, heat consumption due to heat dissipation, and the like.

(Isothermal DSC Measurement)

The predicting means 31 uses the results of isothermal DSC measurement to find reaction parameters on the assumption that the thermosetting material H has a curing reaction velocity represented by the following calculation formula:

$$\frac{d\chi}{dt} = \left\{A_1\exp\left(-\frac{T_1}{T}\right) + A_2\exp\left(-\frac{T_2}{T}\right)\chi^m\right\}(1-\chi)^n \quad \text{[Math. 21]}$$
$$= (K_1 + K_2\chi^m)(1-\chi)^n,$$

-continued $$K_1 = K_1(T) = A_1\exp\left(-\frac{T_1}{T}\right) \quad \text{[Math. 22]}$$
$$K_2 = K_2(T) = A_2\exp\left(-\frac{T_2}{T}\right),$$

where $d\chi/dt$ is the curing reaction velocity of the thermosetting material H, $\chi$ is the curing reaction rate of the thermosetting material H, t is time, T is the absolute temperature of the thermosetting material H, $A_1$, $T_1$, $A_2$, $T_2$, m, and n are reaction parameters peculiar to the thermosetting material H, and $K_1$ and $K_2$ are reaction parameters determined from the thermosetting material H and temperature.

While it is difficult, even through isothermal DSC measurement, to uniquely determine reaction parameters that match the measurement results, the reaction parameters are determined in view of the points below.

In the case where the quantity of generated heat (curing reaction velocity) is small, measurement involve a relatively large measurement error and/or baseline error. The results of the measurement are thus fitted with a reduced weight.

The reaction parameter m is selected (for example, m=1.4) to be consistent with how the curing reaction accelerates over time (that is, as the curing reaction rate increases).

The reaction parameter n is selected (for example, n=3.2) to be consistent with how the curing reaction decelerates over time (that is, as the curing reaction rate increases).

(a) through (e) of FIG. 26 are each a graph illustrating an example of a temporal change in curing reaction velocity and curing reaction rate both measured through isothermal DSC measurement of a sample at a constant temperature. (a) of FIG. 26 illustrates a temporal change in curing reaction velocity and curing reaction rate both measured through isothermal DSC measurement of a sample at a constant temperature of 60° C. (b) of FIG. 26 illustrates a temporal change in curing reaction velocity and curing reaction rate both measured through isothermal DSC measurement of a sample at a constant temperature of 70° C. (c) of FIG. 26 illustrates a temporal change in curing reaction velocity and curing reaction rate both measured through isothermal DSC measurement of a sample at a constant temperature of 80° C. (d) of FIG. 26 illustrates a temporal change in curing reaction velocity and curing reaction rate both measured through isothermal DSC measurement of a sample at a constant temperature of 90° C. (e) of FIG. 26 illustrates a temporal change in curing reaction velocity and curing reaction rate both measured through isothermal DSC measurement of a sample at a constant temperature of 100° C.

The isothermal DSC measurement of a sample at a constant temperature of 60° C. as illustrated in (a) of FIG. 26 show that $K_1$ and $K_2$ at the constant temperature of 60° C. have the following respective values: $K_1=2.63\times10^{-5}$ and $K_2=0.003$.

The isothermal DSC measurement of a sample at a constant temperature of 70° C. as illustrated in (b) of FIG. 26 show that $K_1$ and $K_2$ at the constant temperature of 70° C. have the following respective values: $K_1=0.00012$ and $K_2=0.00579$.

The isothermal DSC measurement of a sample at a constant temperature of 80° C. as illustrated in (c) of FIG. 26 show that $K_1$ and $K_2$ at the constant temperature of 80° C. have the following respective values: $K_1$=0.000164 and $K_2$=0.0189.

The isothermal DSC measurement of a sample at a constant temperature of 90° C. as illustrated in (d) of FIG. 26 show that $K_1$ and $K_2$ at the constant temperature of 90° C. have the following respective values: $K_1$=0.0006 and $K_2$=0.0501.

The isothermal DSC measurement of a sample at a constant temperature of 100° C. as illustrated in (e) of FIG. 26 show that $K_1$ and $K_2$ at the constant temperature of 100° C. have the following respective values: $K_1$=0.002 and $K_2$=0.154.

[2] Determining Reaction Parameters on Arrhenius Plot

The description below deals with how the respective values of $K_1$ and $K_2$ at different temperatures (60° C. to 100° C.) are shown on an Arrhenius plot.

FIG. 27 is a graph illustrating an example Arrhenius plot. The Arrhenius plot illustrated in FIG. 27 allows the reaction parameters to be determined as follows: $A_1$=1.15×10$^{12}$/s, $T_1$=12750K, $A_2$=3.98×10$^{13}$/s, and $T_2$=12440 K (Q=410 J/g, m=1.4, and n=3.2).

(a) through (c) of FIG. 28 are each a graph illustrating an example of how the curing reaction velocity and curing reaction rate of a sample change at a constant temperature rise rate. (a) of FIG. 28 illustrates how the curing reaction velocity and curing reaction rate of a sample change at a temperature rise rate of 10 K/minute. (b) of FIG. 28 illustrates how the curing reaction velocity and curing reaction rate of a sample change at a temperature rise rate of 20 K/minute. (c) of FIG. 28 illustrates how the curing reaction velocity and curing reaction rate of a sample change at a temperature rise rate of 40 K/minute.

As illustrated in (a) through (c) of FIG. 28, the change generally agrees with the results of isothermal DSC measurement at any of the temperature rise rates. This shows that the respective values of the reaction parameters found through isothermal DSC measurement are appropriate.

Determining the reaction parameters $A_1$, $T_1$, $A_2$, and $T_2$ from an Arrhenius plot of the parameters $K_1$ and $K_2$ as described above reduces the number of parameters that are determined at a time. Such determination thus facilitates determining the reaction parameters $A_1$, $T_1$, $A_2$, $T_2$, m, and n.

The present embodiment uses an equivalent heat circuit that is identical in configuration to that of Embodiment 1. The description herein thus omits dealing with the equivalent heat circuit.

[3] Thermal Response Simulation

FIG. 29 is a table that defines an initial temperature control sequence. FIG. 30 is a graph schematically illustrating a temperature change profile for the temperature control section 4, the profile corresponding to the initial temperature control sequence shown in FIG. 29. The initial temperature control sequence shown in FIG. 29 is identical to that shown in FIG. 7.

The predicting means 31 calculates respective temporal shifts of the curing reaction rate χ, curing reaction velocity dχ/dt, and absolute temperature T of a thermosetting material H through a thermal response simulation on the basis of the reaction parameters, equivalent heat circuit, and initial temperature control sequence determined as described above.

FIG. 31 is a graph illustrating the result of a thermal response simulation performed by the predicting means 31. The result of the thermal response simulation performed by the predicting means 31 shows that as illustrated in FIG. 31, executing the initial temperature control sequence may cause the curing reaction velocity of the thermosetting material H to increase drastically at around 130 seconds and consequently cause thermal runaway in the thermosetting material H as a result of the excessive heating.

The result of the thermal response simulation shows that the thermosetting material H has (i) an excessive temperature rise with a maximum value of 127.6 K, (ii) a curing reaction velocity with a maximum value of 7.573 per second, and (iii) a final curing reaction rate of 0.982.

[4] Correcting Temperature Control Sequence

The correcting means 32 corrects, on the basis of the result of a thermal response simulation performed by the predicting means 31 to predict respective temporal shifts in temperature and curing reaction velocity of a thermosetting material H, an initial temperature control sequence to prevent excessive heating from causing thermal runaway in the thermosetting material H.

FIG. 32 is a table that defines a corrected temperature control sequence. As shown in FIG. 32, the correcting means 32 corrects an initial temperature sequence by subdividing the temperature control steps and setting a temperature change rate to decrease the temperature rise rate for the temperature range in which thermal runaway in the thermosetting material H is predicted in the result of a thermal response simulation performed by the predicting means 31.

FIG. 33 is a graph schematically illustrating a temperature change profile for the temperature control section 4, the profile corresponding to the corrected temperature control sequence shown in FIG. 32. FIG. 34 is a graph illustrating the result of a thermal response simulation for the case in which the corrected temperature control sequence shown in FIG. 32 has been executed.

In the case where the temperature control section 4 controls its own temperature on the basis of the corrected temperature control sequence shown in FIG. 32, the temperature of the temperature control section 4 shifts as in the temperature change profile illustrated in FIG. 33. The temperature control section 4 thus has a decreased temperature rise rate in the temperature range in which thermal runaway in the thermosetting material H is predicted in the result of a thermal response simulation performed by the predicting means 31. The correcting means 32 of the present embodiment has decreased the temperature change rate from 1.0 K/s to 0.2 K/s in a temperature range of 110° C. to 130° C., the temperature range covering (i) the temperature of 114.7° C., at which the curing reaction rate is 0.1, and (ii) the temperature of 124.7° C., at which the curing reaction rate is 0.2.

Consequently, executing the corrected temperature control sequence can prevent, as illustrated in FIG. 34, excessive heating from causing thermal runaway in a thermosetting material H. In the case where the temperature control section 4 controls its own temperature on the basis of the corrected temperature control sequence, the thermosetting material H has (i) an excessive temperature rise with a maximum value of 0.0 K, (ii) a curing reaction velocity with a maximum value of 0.045 per second, and (iii) a final curing reaction rate of 0.978.

The present embodiment makes it possible to produce a molding device 1 that easily determines reaction parameters through isothermal DSC measurement, that prevents a thermosetting material H from exhibiting thermal runaway during a molding process, and that prevents a molded article from suffering from physical property unevenness, a deformation, residual stress, and/or a strength decrease.

Embodiment 4

The description below deals with another embodiment of the present invention with reference to FIGS. 35 through 39.

For convenience of explanation, members of the present embodiment that are identical in function to their respective corresponding members described in the above embodiments with reference to drawings are each assigned an identical reference sign, and are not described here.

The description below for the present embodiment deals with automatically optimizing a temperature control sequence with use of a merit function.

[1] Outline of Automatic Optimization

The correcting means 32 of the present embodiment changes individual variables in a variable group to find respective values of the variables which values allow a merit function to return a minimum value (or a local minimum value). Specifically, the correcting means 32 (i) sets the variable group to $x_1, x_2, \ldots, x_n$ and the merit function f to $f(x_1, x_2, \ldots, x_n)$ to find a minimum value of $f(x_1, x_2, \ldots, x_n)$, or (ii) finds a local minimum value of $f(x_1, x_2, \ldots, x_n)$ in the vicinity of the initial values $(x_1, x_2, \ldots, x_n)$. The correcting means 32 thus corrects a temperature control sequence.

A local minimum value of a multivariable function such as $f(x_1, x_2, \ldots, x_n)$ can be found by any of such publicly known methods as Newton-Raphson method, steepest-descent method, conjugate gradient method, and golden section method.

[2] Processes Performed by Correcting Means 32

(1) Arrangement for Variable Group

The correcting means 32 first selects a step number and an item (that is, any one of a target temperature, temperature change rate, and lapse time) from a temperature control sequence to create a parameter to serve as a variable, and thus forms a variable group including one or more variables.

FIG. 35 is an example table that defines a temperature control sequence. FIG. 36 is a table that shows an example variable group formed on the basis of the temperature control sequence shown in FIG. 35.

The correcting means 32 forms a variable group including one or more variables each specifying (i) the step number of a temperature control step and (ii) a target temperature, temperature change rate, or lapse time for that temperature control step. On the assumption that the temperature control section 4 has received the temperature control sequence shown in FIG. 35, the variable group shown in FIG. 36 includes, for example, three variables, namely, No. 1, which is a variable that combines the step number "3" and the item "TARGET TEMPERATURE", No. 2, which is a variable that combines the step number "3" and the item "TEMPERATURE CHANGE RATE", and No. 3, which is a variable that combines the step number "4" and the item "TARGET TEMPERATURE".

(2) Arrangement for Merit Function

The correcting means 32 next creates a merit function that sequences, in order of operation, operands selected from operand candidates. A merit function includes one or more successive operands arranged in order of operation, and evaluates the one or more operands in the order in which the one or more operands are arranged. A merit function performs a predetermined operation for each operand, and after performing an operation for the last operand, returns the function value at that time point.

FIG. 37 is a table that shows example operand candidates. In FIG. 37, $v_i$ is a current value for the i-th operand, $t_i$ is a target value for the i-th operand, and $w_i$ is a weight for the i-th operand. As shown in FIG. 37, operand candidates are categorized into output operands, arithmetic operands, and control operands, each operand having an operation (update condition) defined therefor.

An output operand is an output value calculated through a thermal response simulation. An arithmetic operand is an operand for an arithmetic operation involving an output or arithmetic operand previously calculated. A control operand is a parameter to serve as an input for a thermal response simulation. The correcting means 32 selects one or more operands from the above operand candidates to set a parameter necessary for each operand.

The operand candidates shown in FIG. 37 are mere examples. It is not necessary to use all of the operands to create a merit function. The operand candidates may further include another category (function).

FIG. 38 is an example table that defines a merit function. FIG. 39 is a circuit diagram illustrating an example equivalent heat circuit for describing the parameters shown in FIG. 38.

In the case of the merit function shown in FIG. 38, the operand No. 1 (operation name: time) (i) calculates a time period having elapsed by the end of the step number 5 to assign the calculated value to $v_1$, and (ii) assigns 0 to $w_1$ for the weight. Since the weight is 0, the merit function f is not updated by the operand No. 1, and proceeds to the next operand. The operand No. 5 assumes a curing reaction excessively accelerating as a result of thermal runaway.

Next, the operand No. 2 (operation name: less than) adds $0.01 \times (v_1 - 600)^2$ to the merit function f if $v_1$ is greater than the target value of 600.

Next, the operand No. 3 (operation name: temperature) (i) calculates the maximum value of the temperature difference between a node 2 (see FIG. 39) and a node 1 (see FIG. 39) to assign the maximum value to $v_3$, and (ii) assigns 0 to $w_3$ for the weight. Since the weight is 0, the merit function f is not updated by the operand No. 3, and proceeds to the next operand. The operand No. 3 assumes an excessive temperature rise arising from thermal runaway.

Next, the operand No. 4 (operation name: less than) adds $1 \times (v_3 - 10)^2$ to the merit function f if $v_3$ is greater than the target value of 10.

Next, the operand No. 5 (operation name: rate) (i) calculates the maximum value of the reaction velocity for the block 2 (see FIG. 39) to assign the maximum value to $v_5$, and (ii) assigns 0 to $w_5$ for the weight. Since the weight is 0, the merit function f is not updated by the operand No. 5, and proceeds to the next operand.

Next, the operand No. 6 (operation name: less than) adds $100 \times (v_5 - 0.1)^2$ to the merit function f if $v_5$ is greater than the target value of 0.1.

Next, the operand No. 7 (operation name: set size) changes the thickness L of the block 2 to 0.5. Any change made by a control operand applies to all subsequent operands. The operand No. 7 checks how stable the thermosetting material H is against a thickness change.

The correcting means 32 changes the variable group so that the merit function f, which is as described above updated as the results of operations set for the respective operands, returns a value close to the local minimum after the operation by the last operand. This arrangement makes it possible to correct a temperature control sequence with use of the values of a variable group that allows an updated merit function to return a value close to a local minimum.

The present embodiment is arranged as described above such that the correcting means 32 combines variable operands and candidates freely to create a flexible optimization indicator and set a condition under which a molding process is stable against a change in, for example, property of a thermosetting material and an external environment.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

[Software Implementation Example]

Finally, blocks of the molding device 1 (particularly, the predicting means 31, the correcting means 32, and the temperature control means 41) may be realized by a logic circuit (hardware) provided in an integrated circuit (IC chip), or may be realized by software as executed by a central processing unit (CPU).

In the case where the blocks are realized by software, the molding device 1 includes a CPU and memory devices (memory media). The CPU executes instructions in control programs realizing the functions. The memory devices include a read only memory (ROM) which contains programs, a random access memory (RAM) to which the programs are loaded, and a memory containing the programs and various data. The object of the present invention can also be achieved by mounting to the molding device 1 a computer-readable storage medium containing control program code (executable program, intermediate code program, or source program) for the molding device 1, which is software realizing the aforementioned functions, in order for the computer (or CPU, MPU) to retrieve and execute the program code contained in the storage medium.

The storage medium may be a non-transitory tangible medium, for example, a tape such as a magnetic tape or cassette tape; a magnetic disk such as a floppy (registered trademark) disk or hard disk, or an optical disk such as a CD-ROM, MO, MD, DVD, or CD-R; a card such as an IC card (memory card) or optical card; a semiconductor memory such as a mask ROM, EPROM, EEPROM (registered trademark), or flash ROM; or a logic circuit such as a programmable logic device (PLD) or field programmable gate array (FPGA).

The molding device 1 may be arranged to be connectable to a communications network so that the program code may be delivered over the communications network. The communications network is not limited in any particular manner as long as it allows transmission of program code, and may be, for example, the Internet, an intranet, extranet, LAN, ISDN, VAN, CATV communications network, virtual dedicated network, telephone line network, mobile communications network, or satellite communications network. The transfer medium which makes up the communications network is not limited to any particular arrangement or kind as long as it allows transmission of program code, and may be, for example, wired line such as IEEE 1394, USB, electric power line, cable TV line, telephone line, or asynchronous digital subscriber loop (ADSL) line; or wireless, such as infrared radiation (IrDA, remote control), Bluetooth (registered trademark), 802.11 wireless, high data rate (HDR), near field communication (NFC), digital living network alliance (DLNA), mobile telephone network, satellite line, or terrestrial digital network. The present invention can be achieved by use of a computer data signal embodied in a carrier wave which signal is formed by electronic transmission of the program code.

[Recap]

In order to solve the above problem, a temperature control sequence determining device according to one mode of the present invention is a temperature control sequence determining device for use in a molding device, the molding device including: a heat transfer section for exchanging heat with a target object made of a thermosetting material; and a temperature control section for controlling a temperature of the temperature control section itself or of the heat transfer section, the temperature control sequence determining device being for correcting a temperature control sequence specifying an operation of the temperature control section, the temperature control sequence determining device including: predicting means for predicting a temporal shift in temperature and curing reaction velocity of the thermosetting material during a process of molding the target object; and correcting means for correcting the temperature control sequence on a basis of the temporal shift predicted by the predicting means, the predicting means, on a basis of (i) a calculation formula below for calculating the curing reaction velocity of the thermosetting material, $$\frac{d\chi}{dt} = \left\{A_1\exp\left(-\frac{T_1}{T}\right) + A_2\exp\left(-\frac{T_2}{T}\right)\chi^m\right\}(1-\chi)^n, \quad [\text{Math. 1}]$$

where $d\chi/dt$ is the curing reaction velocity of the thermosetting material, $\chi$ is a curing reaction rate of the thermosetting material, t is time, T is an absolute temperature of the thermosetting material, and $A_1$, $T_1$, $A_2$, $T_2$, m, and n are reaction parameters peculiar to the thermosetting material, (ii) a calculation formula below for calculating a quantity of heat generated by the thermosetting material, $$q = QM\frac{d\chi}{dt}, \quad [\text{Math. 2}]$$

where q is the quantity of the heat generated by the thermosetting material,

Q is a total generated heat density peculiar to the thermosetting material, and

M is a mass of the thermosetting material, (iii) an equivalent heat circuit for equivalently expressing heat generation and heat transfer in the thermosetting material, the heat transfer section, and the temperature control section by using a combination selected from among a temperature source, a heat flow source, thermal resistance, and heat capacity, and (iv) the temperature control sequence before the correction, predicting the temporal shift for a case in which the operation of the temperature control section is specified by the temperature control sequence.

The device method is arranged as follows: The predicting means predicts a temporal shift in temperature and curing reaction velocity of a thermosetting material during a target object molding process with use of (i) a calculation formula for calculating the curing reaction velocity of the thermosetting material, (ii) a calculation formula for calculating the quantity of heat generated in the thermosetting material, (iii) an equivalent heat circuit for equivalently expressing heat generation and heat transfer in the thermosetting material and the heat transfer section, and (iv) a temperature control sequence specifying an operation of the temperature control section. The correcting means then corrects the temperature control sequence, specifying an operation of the temperature control section, on the basis of the temporal shift predicted by the predicting means. This arrangement makes it possible to start temperature control for the temperature control section on the basis of the corrected temperature control sequence.

The above device is consequently a temperature control sequence determining device that makes it possible to suppress thermal runaway in a thermosetting material during a molding process and thus prevent a molded article from having such problems as unevenness in physical property, deformation, residual stress, and decrease in strength.

The temperature control sequence determining device according to one mode of the present invention may preferably be arranged such that the predicting means determines the total generated heat density Q from a measurement result of differential scanning calorimetry of the thermosetting material under a set of constant temperature rise rate conditions; the predicting means fits a measurement result of differential scanning calorimetry of the thermosetting material under two or more sets of conditions of constant temperatures on a basis of the calculation formulae for each of the constant temperatures to determine the reaction parameters m and n and respective values of parameters $K_1$ and $K_2$ calculated by a calculation formula below for each of the constant temperatures, $$K_1 = A_1 \exp\left(-\frac{T_1}{T}\right)$$
$$K_2 = A_2 \exp\left(-\frac{T_2}{T}\right);$$

[Math. 3]

and the predicting means determines the reaction parameters $A_1$, $T_1$, $A_2$, and $T_2$ from an Arrhenius plot of the parameters $K_1$ and $K_2$.

The above arrangement reduces the number of parameters that are determined at a time, and thus facilitates determining the reaction parameters $A_1$, $T_1$, $A_2$, $T_2$, m, and n.

The temperature control sequence determining device according to one mode of the present invention may preferably be arranged such that the correcting means corrects the temperature control sequence so that a difference between the temperature of the thermosetting material and the temperature of the temperature control section is not greater than 10° C. at any time point.

With the above arrangement, the correcting means corrects the temperature control sequence so that the difference between the temperature of the thermosetting material and the temperature of the temperature control section is not greater than 10° C. at any time point. This prevents a sudden increase in curing reaction velocity of the thermosetting material, thus making it possible to prevent thermal runaway.

The above arrangement can consequently reduce damage to and residual stress on a molded article.

The temperature control sequence determining device according to one mode of the present invention may preferably be arranged such that the correcting means corrects the temperature control sequence so that the curing reaction velocity of the thermosetting material is not greater than 0.1 per second at any time point.

With the above arrangement, the correcting means corrects the temperature control sequence so that the curing reaction velocity of the thermosetting material is not greater than 0.1 per second at any time point. This can prevent thermal runaway in the thermosetting material effectively.

The above arrangement can consequently reduce molding unevenness and shrink marks in a molded article.

The temperature control sequence determining device according to one mode of the present invention may preferably be arranged such that the correcting means corrects the temperature control sequence so that the curing reaction rate of the thermosetting material is not less than 0.8 at a time point at which the temperature control sequence is completed.

With the above arrangement, the correcting means corrects the temperature control sequence so that the curing reaction rate of the thermosetting material is not less than 0.8 at a time point at which the temperature control sequence is completed. This can increase a curing reaction rate of the thermosetting material which curing reaction rate is achieved at the time when the molding process is completed.

The above arrangement consequently makes it possible to avoid a situation in which a remaining uncured component of the thermosetting material causes molding unevenness or the thermosetting material remains on the heat transfer section (faulty release).

The temperature control sequence determining device according to one mode of the present invention may preferably be arranged such that the temperature control section further includes (i) a heating and cooling section for heating or cooling the temperature control section itself and (ii) a detecting section for detecting at least one of the temperature of the heat transfer section and a temperature of the heating and cooling section; the temperature control section controls an output of the heating and cooling section to induce the detected temperature to be an induction temperature; the temperature control sequence before the correction includes successive temperature control steps; and the temperature control steps each involve, provided therefor, a temporal change program for the induction temperature and a condition for completing the temperature control step.

The above arrangement makes it possible to perform feedback control of the temperature of the heating and cooling section on the basis of (i) the corrected temperature control sequence outputted by the correcting means and (ii) the detected temperature as detected by the detecting section.

The above arrangement consequently makes it possible to perform temperature control that is stable even under a disturbance.

The temperature control sequence determining device according to one mode of the present invention may preferably be arranged such that the temperature control steps each involve, provided therefor, a target temperature for the temperature control step and optionally a temperature change rate at which to change the induction temperature; the temperature control section, for a temperature control step involving the temperature change rate provided therefor, changes the induction temperature continuously at the temperature change rate from a start of the temperature control step with the temperature change rate so that the induction temperature will be equal to the target temperature; the temperature control section, for a temperature control step involving no temperature change rate provided therefor, changes the induction temperature in steps from a start of the temperature control step with no temperature change rate so that the induction temperature will be equal to the target temperature; the temperature control steps each further involve, provided therefor, a lapse time for the temperature control step and optionally a trigger temperature; the temperature control section, for a temperature control step involving the trigger temperature provided therefor, completes the temperature control step with the trigger temperature the lapse time after the detected temperature reaches the trigger temperature; and the temperature control section, for a temperature control step involving no trigger temperature provided therefor, completes the temperature control step with no trigger temperature the lapse time after a start of the temperature control step.

The above arrangement makes it possible to provide the temperature control section with an induction temperature having a profile suitable for the properties of the thermosetting material, and can consequently shorten the duration of a molding process while suppressing thermal runaway.

The temperature control sequence determining device according to one mode of the present invention may preferably be arranged such that the temperature of the thermosetting material at a time point at which the curing reaction rate of the thermosetting material has a value within a range of 0.05 to 0.2 is a gelation temperature; and the correcting means corrects the temperature control sequence by dividing a temperature control step among the temperature control steps, which temperature control step covers a time point at which the temperature of the temperature control section is equal to the gelation temperature, into two temperature control steps at a time point before the time point at which the temperature of the temperature control section is equal to the gelation temperature.

Preventing thermal runaway merely requires decreasing the temperature rise rate (temperature change rate). Slowly increasing the temperature from the start of a molding process to its end will, however, require a long time for the molding process. The above arrangement, in view of this, subdivides a temperature control step into temperature control steps with respective durations that are minimally required for prevention of thermal runaway, and thus reduces the temperature rise rate (or decreases the temperature) within a duration set as a result of the subdivision. This makes it possible to prevent thermal runaway while not requiring a long time for the molding process.

With the above arrangement, the correcting means corrects the temperature control sequence by dividing a temperature control step among the temperature control steps, which temperature control step covers a time point at which the temperature of the temperature control section is equal to the gelation temperature, into two temperature control steps at a time point before the time point at which the temperature of the temperature control section is equal to the gelation temperature. By thus dividing a temperature control step to shorten the duration of a temperature control step that covers the gelation temperature, at which the curing reaction progresses at the most accelerated pace because of the characteristics of the reaction velocity formula, the period of time during which the temperature rise rate is low can be shortened.

The temperature control sequence determining device according to one mode of the present invention may preferably be arranged such that the temperature of the thermosetting material at a time point at which the curing reaction rate of the thermosetting material has a value within a range of 0.05 to 0.2 is a gelation temperature; and the correcting means corrects the temperature control sequence by dividing a temperature control step among the temperature control steps, which temperature control step covers a time point at which the temperature of the temperature control section is equal to the gelation temperature, into two temperature control steps at a time point after the time point at which the temperature of the temperature control section is equal to the gelation temperature.

With the above arrangement, the correcting means corrects the temperature control sequence by dividing a temperature control step among the temperature control steps, which temperature control step covers a time point at which the temperature of the temperature control section is equal to the gelation temperature, into two temperature control steps at a time point after the time point at which the temperature of the temperature control section is equal to the gelation temperature. By thus dividing a temperature control step to shorten the duration of a temperature control step that covers the gelation temperature, at which the curing reaction progresses at the most accelerated pace because of the characteristics of the reaction velocity formula, the period of time during which the temperature rise rate is low can be shortened.

The temperature control sequence determining device according to one mode of the present invention may preferably be arranged such that the correcting means, for the temperature control step covering the time point at which the temperature of the temperature control section is equal to the gelation temperature, corrects the temperature control sequence by (i) providing the temperature control step covering the time point, at which the temperature of the temperature control section is equal to the gelation temperature, with a value lower than a limit value of a heating capability of the heating and cooling section in a case where the temperature control step covering the time point, at which the temperature of the temperature control section is equal to the gelation temperature, has no temperature change rate provided therefor or by (ii) reducing the temperature change rate in a case where the temperature control step covering the time point, at which the temperature of the temperature control section is equal to the gelation temperature, has the temperature change rate provided therefor.

With the above arrangement, the correcting means, for the temperature control step covering the time point at which the temperature of the temperature control section is equal to the gelation temperature, corrects the temperature control sequence by (i) providing the temperature control step covering the time point, at which the temperature of the temperature control section is equal to the gelation temperature, with a value lower than a limit value of a heating capability of the heating and cooling section in a case where the temperature control step covering the time point, at which the temperature of the temperature control section is equal to the gelation temperature, has no temperature change rate provided therefor or by (ii) reducing the temperature change rate in a case where the temperature control step covering the time point, at which the temperature of the temperature control section is equal to the gelation temperature, has the temperature change rate provided therefor. The above arrangement can thus reduce the temperature rise rate of the thermosetting material for the temperature control step covering the time point, at which the temperature of the temperature control section is equal to the gelation temperature, and can consequently easily prevent thermal runaway in the thermosetting material.

The temperature control sequence determining device according to one mode of the present invention may preferably be arranged such that the correcting means, for the temperature control step covering the time point at which the temperature of the temperature control section is equal to the gelation temperature, corrects the temperature control sequence by reducing the target temperature.

With the above arrangement, the correcting means, for the temperature control step covering the time point at which the temperature of the temperature control section is equal to the gelation temperature, corrects the temperature control sequence by reducing the target temperature. The above arrangement can thus reduce the temperature rise rate of the thermosetting material for the temperature control step covering the time point, at which the temperature of the temperature control section is equal to the gelation temperature, and can consequently easily prevent thermal runaway in the thermosetting material.

The temperature control sequence determining device according to one mode of the present invention may preferably be arranged such that the correcting means corrects the temperature control sequence by providing one or more of the temperature control steps each with the trigger temperature that differs from the target temperature.

With the above arrangement, the correcting means corrects the temperature control sequence by providing a trigger temperature that differs from the target temperature. This makes it possible to proceed to the next step before the temperature rise rate and the temperature fall rate decrease for convergence and therefore shorten the duration of the molding process.

The temperature control sequence determining device according to one mode of the present invention may preferably be arranged such that the correcting means forms a variable group including one or more variables each specifying a step number of a temperature control step and the target temperature, temperature change rate, or lapse time for the temperature control step having the step number; the correcting means creates a merit function that sequences, in order of operation, operands selected from a plurality of operand candidates; and the correcting means corrects the temperature control sequence by updating the merit function on a basis of an update condition set for each of the operands to update the merit function and by changing values of the variable group to allow the updated merit function to return a value close to a local minimum.

With the above arrangement, the correcting means forms a variable group including one or more variables each specifying a step number of a temperature control step and the target temperature, temperature change rate, or lapse time for the temperature control step having the step number, and creates a merit function that sequences, in order of operation, operands selected from a plurality of operand candidates. Further, the correcting means corrects the temperature control sequence by updating the merit function on a basis of an update condition set for each of the operands to update the merit function and by changing values of the variable group to allow the updated merit function to return a value close to a local minimum. This makes it possible to correct a temperature control sequence with use of the values of a variable group that allows an updated merit function to return a value close to a local minimum.

Consequently, with the above arrangement, the correcting means combines variable operand candidates freely to create a flexible optimization indicator and set a condition under which a molding process is stable against a change in, for example, property of a thermosetting material and an external environment.

In order to solve the above problem, a molding device according to one mode of the present invention includes: the temperature control sequence determining device.

The above molding device is consequently a molding device that makes it possible to suppress thermal runaway in a thermosetting material during a molding process and thus prevent a molded article from having such problems as unevenness in physical property, deformation, residual stress, and decrease in strength.

The temperature control sequence determining device may be in the form of a computer. In this case, the present invention encompasses: a program for causing a computer to operate as each of the above means so that the control device can be in the form of a computer; and a computer-readable recording medium storing the program thereon.

In order to solve the above problem, a temperature control sequence determining method according to one mode of the present invention is a temperature control sequence determining method for use in a molding device, the molding device including: a heat transfer section for exchanging heat with a target object made of a thermosetting material; and a temperature control section for controlling a temperature of the temperature control section itself or of the heat transfer section, the temperature control sequence determining method being for correcting a temperature control sequence specifying an operation of the temperature control section, the temperature control sequence determining method including the steps of: (a) predicting a temporal shift in temperature and curing reaction velocity of the thermosetting material during a process of molding the target object; and (b) correcting the temperature control sequence on a basis of the temporal shift predicted in the step (a), the step (a), on a basis of (i) a calculation formula below for calculating the curing reaction velocity of the thermosetting material, $$\frac{d\chi}{dt} = \left\{A_1\exp\left(-\frac{T_1}{T}\right) + A_2\exp\left(-\frac{T_2}{T}\right)\chi^m\right\}(1-\chi)^n, \quad \text{[Math. 4]}$$

where
$d\chi/dt$ is the curing reaction velocity of the thermosetting material,
$\chi$ is a curing reaction rate of the thermosetting material,
t is time,
T is an absolute temperature of the thermosetting material, and
$A_1$, $T_1$, $A_2$, $T_2$, m, and n are reaction parameters peculiar to the thermosetting material,
(ii) a calculation formula below for calculating a quantity of heat generated by the thermosetting material, $$q = QM\frac{d\chi}{dt}, \quad \text{[Math. 5]}$$

where
q is the quantity of the heat generated by the thermosetting material,
Q is a total generated heat density peculiar to the thermosetting material, and
M is a mass of the thermosetting material,
(iii) an equivalent heat circuit for equivalently expressing respective amounts of heat generation and heat transfer in the thermosetting material, the heat transfer section, and the temperature control section by using a combination selected from among a temperature source, a heat flow source, thermal resistance, and heat capacity, and (iv) the temperature control sequence before the correction, predicting the temporal shift for a case in which the operation of the temperature control section is specified by the temperature control sequence.

The above method is arranged as follows: The step (a) predicts a temporal shift in temperature and curing reaction velocity of a thermosetting material during a target object molding process with use of (i) a calculation formula for calculating the curing reaction velocity of the thermosetting material, (ii) a calculation formula for calculating the quantity of heat generated in the thermosetting material, (iii) an equivalent heat circuit for equivalently expressing heat generation and heat transfer in the thermosetting material, the heat transfer section, and the temperature control section, and (iv) a temperature control sequence specifying an operation of the temperature control section. The step (b) then corrects the temperature control sequence, specifying an operation of the temperature control section, on the basis of the temporal shift predicted in the step (a). This arrangement makes it possible to start temperature control for the temperature control section on the basis of the corrected temperature control sequence.

The above method is consequently a temperature control sequence determining method that makes it possible to suppress thermal runaway in a thermosetting material during a molding process and thus prevent a molded article from having such problems as unevenness in physical property, deformation, residual stress, and decrease in strength.

The temperature control sequence determining method according to one mode of the present invention may preferably be arranged such that the step (a) determines the total generated heat density Q from a measurement result of differential scanning calorimetry of the thermosetting material under a set of constant temperature rise rate conditions; the step (a) fits a measurement result of differential scanning calorimetry of the thermosetting material under two or more sets of conditions of constant temperatures on a basis of the calculation formulae for each of the constant temperatures to determine the reaction parameters m and n and respective values of parameters $K_1$ and $K_2$ calculated by a calculation formula below for each of the constant temperatures, $$K_1 = A_1 \exp\left(-\frac{T_1}{T}\right)$$
$$K_2 = A_2 \exp\left(-\frac{T_2}{T}\right);$$

[Math. 6]

and the step (a) determines the reaction parameters $A_1$, $T_1$, $A_2$, and $T_2$ from an Arrhenius plot of the parameters $K_1$ and $K_2$.

The above method reduces the number of parameters that are determined at a time, and thus facilitates determining the reaction parameters $A_1$, $T_1$, $A_2$, $T_2$, m, and n.

The temperature control sequence determining method according to one mode of the present invention may preferably be arranged such that the step (b) corrects the temperature control sequence so that a difference between the temperature of the thermosetting material and the temperature of the temperature control section is not greater than 10° C. at any time point.

With the above method, the step (b) corrects the temperature control sequence so that the difference between the temperature of the thermosetting material and the temperature of the temperature control section is not greater than 10° C. at any time point. This prevents a sudden increase in curing reaction velocity of the thermosetting material, thus making it possible to prevent thermal runaway.

The above method can consequently reduce damage to and residual stress on a molded article.

The temperature control sequence determining method according to one mode of the present invention may preferably be arranged such that the step (b) corrects the temperature control sequence so that the curing reaction velocity of the thermosetting material is not greater than 0.1 per second at any time point.

With the above method, the step (b) corrects the temperature control sequence so that the curing reaction velocity of the thermosetting material is not greater than 0.1 per second at any time point. This can prevent thermal runaway in the thermosetting material effectively.

The above method can consequently reduce molding unevenness and shrink marks in a molded article.

The temperature control sequence determining method according to one mode of the present invention may preferably be arranged such that the step (b) corrects the temperature control sequence so that the curing reaction rate of the thermosetting material is not less than 0.8 at a time point at which the temperature control sequence is completed.

With the above method, the step (b) corrects the temperature control sequence so that the curing reaction rate of the thermosetting material is not less than 0.8 at a time point at which the temperature control sequence is completed. This can increase a curing reaction rate of the thermosetting material which curing reaction rate is achieved at the time when the molding process is completed.

The above method consequently makes it possible to avoid a situation in which a remaining uncured component of the thermosetting material causes molding unevenness or the thermosetting material remains on the heat transfer section (faulty release).

The temperature control sequence determining method according to one mode of the present invention may preferably be arranged such that the temperature control section further includes (i) a heating and cooling section for heating or cooling the temperature control section itself and (ii) a detecting section for detecting at least one of the temperature of the heat transfer section and a temperature of the heating and cooling section; the temperature control section controls an output of the heating and cooling section to induce the detected temperature to be an induction temperature; the temperature control sequence before the correction includes successive temperature control steps; and the temperature control steps each involve, provided therefor, a temporal change program for the induction temperature and a condition for completing the temperature control step.

The above method makes it possible to perform feedback control of the temperature of the heating and cooling section on the basis of (i) the corrected temperature control sequence and (ii) the detected temperature as detected by the detecting section.

The above method consequently makes it possible to perform temperature control that is stable even under a disturbance.

The temperature control sequence determining method according to one mode of the present invention may preferably be arranged such that the temperature control steps each involve, provided therefor, a target temperature for the temperature control step and optionally a temperature change rate at which to change the induction temperature; the temperature control section, for a temperature control step involving the temperature change rate provided therefor, changes the induction temperature continuously at the temperature change rate from a start of the temperature control step with the temperature change rate so that the induction temperature will be equal to the target temperature; the temperature control section, for a temperature control step involving no temperature change rate provided therefor, changes the induction temperature in steps from a start of the temperature control step with no temperature change rate so that the induction temperature will be equal to the target temperature; the temperature control steps each further involve, provided therefor, a lapse time for the temperature control step and optionally a trigger temperature; the temperature control section, for a temperature control step involving the trigger temperature provided therefor, completes the temperature control step with the trigger temperature the lapse time after the detected temperature reaches the trigger temperature; and the temperature control section, for a temperature control step involving no trigger temperature provided therefor, completes the temperature control step with no trigger temperature the lapse time after a start of the fourth temperature control step.

The above method makes it possible to provide the temperature control section with an induction temperature having a profile suitable for the properties of the thermosetting material, and can consequently shorten the duration of a molding process while suppressing thermal runaway.

The temperature control sequence determining method according to one mode of the present invention may preferably be arranged such that the temperature of the thermosetting material at a time point at which the curing reaction rate of the thermosetting material has a value within a range of 0.05 to 0.2 is a gelation temperature; and the step (b) corrects the temperature control sequence by dividing a temperature control step among the temperature control steps, which temperature control step covers a time point at which the temperature of the temperature control section is equal to the gelation temperature, into two temperature control steps at a time point before the time point at which the temperature of the temperature control section is equal to the gelation temperature.

The above method can, as described above, divide a portion (time) into temperature control steps with respective minimally required durations, and thus reduces the temperature rise rate (or decreases the temperature). This makes it possible to prevent thermal runaway while not requiring a long time for the molding process.

With the above method, the step (b) corrects the temperature control sequence by dividing a temperature control step among the temperature control steps, which temperature control step covers a time point at which the temperature of the temperature control section is equal to the gelation temperature, into two temperature control steps at a time point before the time point at which the temperature of the temperature control section is equal to the gelation temperature. By thus dividing a temperature control step to shorten the duration of a temperature control step that covers the gelation temperature, at which the curing reaction progresses at the most accelerated pace because of the characteristics of the reaction velocity formula, the period of time during which the temperature rise rate is low can be shortened.

The temperature control sequence determining method according to one mode of the present invention may preferably be arranged such that the temperature of the thermosetting material at a time point at which the curing reaction rate of the thermosetting material has a value within a range of 0.05 to 0.2 is a gelation temperature; and the step (b) corrects the temperature control sequence by dividing a temperature control step among the temperature control steps, which temperature control step covers a time point at which the temperature of the temperature control section is equal to the gelation temperature, into two temperature control steps at a time point after the time point at which the temperature of the temperature control section is equal to the gelation temperature.

With the above method, the step (b) corrects the temperature control sequence by dividing a temperature control step among the temperature control steps, which temperature control step covers a time point at which the temperature of the temperature control section is equal to the gelation temperature, into two temperature control steps at a time point after the time point at which the temperature of the temperature control section is equal to the gelation temperature. By thus dividing a temperature control step to shorten the duration of a temperature control step that covers the gelation temperature, at which the curing reaction progresses at the most accelerated pace because of the characteristics of the reaction velocity formula, the period of time during which the temperature rise rate is low can be shortened.

The temperature control sequence determining method according to one mode of the present invention may preferably be arranged such that the step (b), for the temperature control step covering the time point at which the temperature of the temperature control section is equal to the gelation temperature, corrects the temperature control sequence by (i) providing the temperature control step covering the time point, at which the temperature of the temperature control section is equal to the gelation temperature, with a value lower than a limit value of a heating capability of the heating and cooling section in a case where the temperature control step covering the time point, at which the temperature of the temperature control section is equal to the gelation temperature, has no temperature change rate provided therefor or by (ii) reducing the temperature change rate in a case where the temperature control step covering the time point, at which the temperature of the temperature control section is equal to the gelation temperature, has the temperature change rate provided therefor.

With the above method, the step (b), for the temperature control step covering the time point at which the temperature of the temperature control section is equal to the gelation temperature, corrects the temperature control sequence by (i) providing the temperature control step covering the time point, at which the temperature of the temperature control section is equal to the gelation temperature, with a value lower than a limit value of a heating capability of the heating and cooling section in a case where the temperature control step covering the time point, at which the temperature of the temperature control section is equal to the gelation temperature, has no temperature change rate provided therefor or by (ii) reducing the temperature change rate in a case where the temperature control step covering the time point, at which the temperature of the temperature control section is equal to the gelation temperature, has the temperature change rate provided therefor. The above method can thus reduce the temperature rise rate of the thermosetting material for the temperature control step covering the time point, at which the temperature of the temperature control section is equal to the gelation temperature, and can consequently easily prevent thermal runaway in the thermosetting material.

The temperature control sequence determining method according to one mode of the present invention may preferably be arranged such that the step (b), for the temperature control step covering the time point at which the temperature of the temperature control section is equal to the gelation temperature, corrects the temperature control sequence by reducing the target temperature.

With the above method, the step (b), for the temperature control step covering the time point at which the temperature of the temperature control section is equal to the gelation temperature, corrects the temperature control sequence by reducing the target temperature. The above method can thus reduce the temperature rise rate of the thermosetting material for the temperature control step covering the time point, at which the temperature of the temperature control section is equal to the gelation temperature, and can consequently easily prevent thermal runaway in the thermosetting material.

The temperature control sequence determining method according to one mode of the present invention may preferably be arranged such that the step (b) corrects the temperature control sequence by providing one or more of the temperature control steps each with the trigger temperature that differs from the target temperature.

With the above method, the step (b) corrects the temperature control sequence by providing a trigger temperature that differs from the target temperature. This makes it possible to proceed to the next step before the temperature rise rate and the temperature fall rate decrease for convergence and therefore shorten the duration of the molding process.

The temperature control sequence determining method according to one mode of the present invention may preferably be arranged such that the step (b) forms a variable group including one or more variables each specifying a step number of a temperature control step and the target temperature, temperature change rate, or lapse time for the temperature control step having the step number; the step (b) creates a merit function that sequences, in order of operation, operands selected from a plurality of operand candidates; and the step (b) corrects the temperature control sequence by updating the merit function on a basis of an update condition set for each of the operands to update the merit function and by changing values of the variable group to allow the updated merit function to return a value close to a local minimum.

With the above method, the step (b) forms a variable group including one or more variables each specifying a step number of a temperature control step and the target temperature, temperature change rate, or lapse time for the temperature control step having the step number, and creates a merit function that sequences, in order of operation, operands selected from a plurality of operand candidates. Further, the step (b) corrects the temperature control sequence by updating the merit function on a basis of an update condition set for each of the operands to update the merit function and by changing values of the variable group to allow the updated merit function to return a value close to a local minimum. This makes it possible to correct a temperature control sequence with use of the values of a variable group that allows an updated merit function to return a value close to a local minimum.

Consequently, with the above method, the user combines variable operand candidates freely to create a flexible optimization indicator and set a condition under which a molding process is stable against a change in, for example, property of a thermosetting material and an external environment.

INDUSTRIAL APPLICABILITY

The present invention is suitably applicable to a molding device for molding an article while controlling the temperature of a target object made of a thermosetting material.

REFERENCE SIGNS LIST 1 molding device
1a molding device
3 temperature control sequence determining section (temperature control sequence determining device)
4 temperature control section
5 heat transfer section
31 predicting means
32 correcting means
41 temperature control means
42 heating/cooling section
43 temperature detecting section (detecting section)

The invention claimed is:

1. A temperature control sequence determining device for use in a molding device,
    the molding device including:
        a heat transfer section for exchanging heat with a target object made of a thermosetting material; and
        a temperature control section for controlling a temperature of the temperature control section itself or of the heat transfer section,
    the temperature control sequence determining device being for correcting a temperature control sequence specifying an operation of the temperature control section, the temperature control sequence determining device comprising:
        predicting means for predicting a temporal shift in temperature and curing reaction velocity of the thermosetting material during a process of molding the target object; and
        correcting means for correcting the temperature control sequence on a basis of the temporal shift predicted by the predicting means,
    the predicting means, on a basis of
    (i) a calculation formula Math. 1 below for calculating the curing reaction velocity of the thermosetting material, $$\frac{d\chi}{dt} = \left\{ A_1 \exp\left(-\frac{T_1}{T}\right) + A_2 \exp\left(-\frac{T_2}{T}\right) \chi^m \right\} (1-\chi)^n, \quad \text{[Math. 1]}$$

where
d$\chi$/dt is the curing reaction velocity of the thermosetting material,
$\chi$ is a curing reaction rate of the thermosetting material,
t is time,
T is an absolute temperature of the thermosetting material, and
$A_1$, $T_1$, $A_2$, $T_2$, m, and n are reaction parameters peculiar to the thermosetting material,
(ii) a calculation formula Math. 2 below for calculating a quantity of heat generated by the thermosetting material, $$q = QM \frac{d\chi}{dt}, \quad \text{[Math. 2]},$$

where
q is the quantity of the heat generated by the thermosetting material,
Q is a total generated heat density peculiar to the thermosetting material, and
M is a mass of the thermosetting material, (iii) an equivalent heat circuit for equivalently expressing heat generation and heat transfer in the thermosetting material, the heat transfer section, and the temperature control section by using a combination selected from among a temperature source, a heat flow source, thermal resistance, and heat capacity, and (iv) the temperature control sequence before the correction, predicting the temporal shift for a case in which the operation of the temperature control section is specified by the temperature control sequence.

2. The temperature control sequence determining device according to claim 1, wherein:

the predicting means determines the total generated heat density Q from a measurement result of differential scanning calorimetry of the thermosetting material under a set of constant temperature rise rate conditions;

the predicting means fits a measurement result of differential scanning calorimetry of the thermosetting material under two or more sets of conditions of constant temperatures on a basis of the calculation formulae for each of the constant temperatures to determine the reaction parameters m and n and respective values of parameters $K_1$ and $K_2$ calculated by a calculation formula Math. 3 below for each of the constant temperatures, $$K_1 = A_1 \exp\left(-\frac{T_1}{T}\right)$$
$$K_2 = A_2 \exp\left(-\frac{T_2}{T}\right);$$

[Math. 3]

and the predicting means determines the reaction parameters $A_1$, $T_1$, $A_2$, and $T_2$ from an Arrhenius plot of the parameters $K_1$ and $K_2$.

3. The temperature control sequence determining device according to claim 1, wherein:

the correcting means corrects the temperature control sequence so that a difference between the temperature of the thermosetting material and the temperature of the temperature control section is not greater than 10° C. at any time point.

4. The temperature control sequence determining device according to claim 1, wherein:

the correcting means corrects the temperature control sequence so that the curing reaction velocity of the thermosetting material is not greater than 0.1 per second at any time point.

5. The temperature control sequence determining device according to claim 1, wherein:

the correcting means corrects the temperature control sequence so that the curing reaction rate of the thermosetting material is not less than 0.8 at a time point at which the temperature control sequence is completed.

6. The temperature control sequence determining device according to claim 1, wherein:

the temperature control section further includes (i) a heating and cooling section for heating or cooling the temperature control section itself and (ii) a detecting section for detecting at least one of the temperature of the heat transfer section and a temperature of the heating and cooling section;

the temperature control section controls an output of the heating and cooling section to induce the detected temperature to be an induction temperature;

the temperature control sequence before the correction includes successive temperature control steps; and the temperature control steps each involve, provided therefor, a temporal change program for the induction temperature and a condition for completing the temperature control step.

7. The temperature control sequence determining device according to claim 6, wherein:

the temperature control steps each involve, provided therefor, a target temperature for the temperature control step and optionally a temperature change rate at which to change the induction temperature;

the temperature control section, for a temperature control step involving the temperature change rate provided therefor, changes the induction temperature continuously at the temperature change rate from a start of the temperature control step with the temperature change rate so that the induction temperature will be equal to the target temperature;

the temperature control section, for a temperature control step involving no temperature change rate provided therefor, changes the induction temperature in steps from a start of the temperature control step with no temperature change rate so that the induction temperature will be equal to the target temperature;

the temperature control steps each further involve, provided therefor, a lapse time for the temperature control step and optionally a trigger temperature;

the temperature control section, for a temperature control step involving the trigger temperature provided therefor, completes the temperature control step with the trigger temperature the lapse time after the detected temperature reaches the trigger temperature; and the temperature control section, for a temperature control step involving no trigger temperature provided therefor, completes the temperature control step with no trigger temperature the lapse time after a start of the temperature control step.

8. The temperature control sequence determining device according to claim 7, wherein:

the temperature of the thermosetting material at a time point at which the curing reaction rate of the thermosetting material has a value within a range of 0.05 to 0.2 is a gelation temperature; and the correcting means corrects the temperature control sequence by dividing a temperature control step among the temperature control steps, which temperature control step covers a time point at which the temperature of the temperature control section is equal to the gelation temperature, into two temperature control steps at a time point before the time point at which the temperature of the temperature control section is equal to the gelation temperature.

9. The temperature control sequence determining device according to claim 7, wherein:

the temperature of the thermosetting material at a time point at which the curing reaction rate of the thermosetting material has a value within a range of 0.05 to 0.2 is a gelation temperature; and the correcting means corrects the temperature control sequence by dividing a temperature control step among the temperature control steps, which temperature control step covers a time point at which the temperature of the temperature control section is equal to the gelation temperature, into two temperature control steps at a time point after the time point at which the temperature of the temperature control section is equal to the gelation temperature.

10. The temperature control sequence determining device according to claim 8, wherein:
the correcting means, for the temperature control step covering the time point at which the temperature of the temperature control section is equal to the gelation temperature, corrects the temperature control sequence by (i) providing the temperature control step covering the time point, at which the temperature of the temperature control section is equal to the gelation temperature, with a value lower than a limit value of a heating capability of the heating and cooling section in a case where the temperature control step covering the time point, at which the temperature of the temperature control section is equal to the gelation temperature, has no temperature change rate provided therefor or by (ii) reducing the temperature change rate in a case where the temperature control step covering the time point, at which the temperature of the temperature control section is equal to the gelation temperature, has the temperature change rate provided therefor.

11. The temperature control sequence determining device according to claim 8, wherein:
the correcting means, for the temperature control step covering the time point at which the temperature of the temperature control section is equal to the gelation temperature, corrects the temperature control sequence by reducing the target temperature.

12. The temperature control sequence determining device according to claim 7, wherein:
the correcting means corrects the temperature control sequence by providing one or more of the temperature control steps each with the trigger temperature that differs from the target temperature.

13. The temperature control sequence determining device according to claim 7, wherein:
the correcting means forms a variable group including one or more variables each specifying a step number of a temperature control step and the target temperature, temperature change rate, or lapse time for the temperature control step having the step number;
the correcting means creates a merit function that sequences, in order of operation, operands selected from a plurality of operand candidates; and
the correcting means corrects the temperature control sequence by updating the merit function on a basis of an update condition set for each of the operands to update the merit function and by changing values of the variable group to allow the updated merit function to return a value close to a local minimum.

14. A molding device comprising:
the temperature control sequence determining device according to claim 1.

15. A non-transitory computer-readable recording medium storing thereon a program for causing a computer to operate as each of means included in a temperature control sequence determining device for use in a molding device,
the molding device including:
a heat transfer section for exchanging heat with a target object made of a thermosetting material; and
a temperature control section for controlling a temperature of the temperature control section itself or of the heat transfer section,
the temperature control sequence determining device being for correcting a temperature control sequence specifying an operation of the temperature control section, the temperature control sequence determining device comprising:
predicting means for predicting a temporal shift in temperature and curing reaction velocity of the thermosetting material during a process of molding the target object; and
correcting means for correcting the temperature control sequence on a basis of the temporal shift predicted by the predicting means,
the predicting means, on a basis of
(i) a calculation formula Math. 1 for calculating the curing reaction velocity of the thermosetting material, $$\frac{d\chi}{dt} = \left\{ A_1 \exp\left(-\frac{T_1}{T}\right) + A_2 \exp\left(-\frac{T_2}{T}\right) \chi^m \right\} (1-\chi)^n, \quad [\text{Math. 1}],$$

where
$d\chi/dt$ is the curing reaction velocity of the thermosetting material,
$\chi$ is a curing reaction rate of the thermosetting material,
t is time,
T is an absolute temperature of the thermosetting material, and
$A_1$, $T_1$, $A_2$, $T_2$, m, and n are reaction parameters peculiar to the thermosetting material,
(ii) a calculation formula Math. 2 below for calculating a quantity of heat generated by the thermosetting material, $$q = QM\frac{d\chi}{dt}, \quad [\text{Math. 2}],$$

where
q is the quantity of the heat generated by the thermosetting material,
Q is a total generated heat density peculiar to the thermosetting material, and
M is a mass of the thermosetting material,
(iii) an equivalent heat circuit for equivalently expressing heat generation and heat transfer in the thermosetting material, the heat transfer section, and the temperature control section by using a combination selected from among a temperature source, a heat flow source, thermal resistance, and heat capacity, and
(iv) the temperature control sequence before the correction,
predicting the temporal shift for a case in which the operation of the temperature control section is specified by the temperature control sequence.

16. A temperature control sequence determining method for use in a molding device,
the molding device including:
a heat transfer section for exchanging heat with a target object made of a thermosetting material; and
a temperature control section for controlling a temperature of the temperature control section itself or of the heat transfer section,
the temperature control sequence determining method being for correcting a temperature control sequence specifying an operation of the temperature control section, the temperature control sequence determining method comprising the steps of:
(a) predicting a temporal shift in temperature and curing reaction velocity of the thermosetting material during a process of molding the target object; and
(b) correcting the temperature control sequence on a basis of the temporal shift predicted in the step (a), the step (a), on a basis of
(i) a calculation formula Math. 4 below for calculating the curing reaction velocity of the thermosetting material, $$\frac{d\chi}{dt} = \left\{A_1\exp\left(-\frac{T_1}{T}\right) + A_2\exp\left(-\frac{T_2}{T}\right)\chi^m\right\}(1-\chi)^n, \quad \text{[Math. 4]}$$

where
$d\chi/dt$ is the curing reaction velocity of the thermosetting material,
$\chi$ is a curing reaction rate of the thermosetting material,
t is time,
T is an absolute temperature of the thermosetting material, and
$A_1$, $T_1$, $A_2$, $T_2$, m, and n are reaction parameters peculiar to the thermosetting material,
(ii) a calculation formula Math. 5 for calculating a quantity of heat generated by the thermosetting material, $$q = QM\frac{d\chi}{dt}, \quad \text{[Math. 5]}$$

where
q is the quantity of the heat generated by the thermosetting material,
Q is a total generated heat density peculiar to the thermosetting material, and
M is a mass of the thermosetting material,
(iii) an equivalent heat circuit for equivalently expressing heat generation and heat transfer in the thermosetting material, the heat transfer section, and the temperature control section by using a combination selected from among a temperature source, a heat flow source, thermal resistance, and heat capacity, and
(iv) the temperature control sequence before the correction,
predicting the temporal shift for a case in which the operation of the temperature control section is specified by the temperature control sequence.

17. The temperature control sequence determining method according to claim 16, wherein:
the step (a) determines the total generated heat density Q from a measurement result of differential scanning calorimetry of the thermosetting material under a set of constant temperature rise rate conditions;
the step (a) fits a measurement result of differential scanning calorimetry of the thermosetting material under two or more sets of conditions of constant temperatures on a basis of the calculation formulae for each of the constant temperatures to determine the reaction parameters m and n and respective values of parameters $K_1$ and $K_2$ calculated by a calculation formula Math. 6 below for each of the constant temperatures, $$K_1 = A_1\exp\left(-\frac{T_1}{T}\right) \quad \text{[Math. 6]}$$

-continued
$$K_2 = A_2\exp\left(-\frac{T_2}{T}\right);$$

and
the step (a) determines the reaction parameters $A_1$, $T_1$, $A_2$, and $T_2$ from an Arrhenius plot of the parameters $K_1$ and $K_2$.

18. The temperature control sequence determining method according to claim 16, wherein:
the step (b) corrects the temperature control sequence so that a difference between the temperature of the thermosetting material and the temperature of the temperature control section is not greater than 10° C. at any time point.

19. The temperature control sequence determining method according to claim 16, wherein:
the step (b) corrects the temperature control sequence so that the curing reaction velocity of the thermosetting material is not greater than 0.1 per second at any time point.

20. The temperature control sequence determining method according to claim 16, wherein:
the step (b) corrects the temperature control sequence so that the curing reaction rate of the thermosetting material is not less than 0.8 at a time point at which the temperature control sequence is completed.

21. The temperature control sequence determining method according to claim 16, wherein:
the temperature control section further includes (i) a heating and cooling section for heating or cooling the temperature control section itself and (ii) a detecting section for detecting at least one of the temperature of the heat transfer section and a temperature of the heating and cooling section;
the temperature control section controls an output of the heating and cooling section to induce the detected temperature to be an induction temperature;
the temperature control sequence before the correction includes successive temperature control steps; and
the temperature control steps each involve, provided therefor, a temporal change program for the induction temperature and a condition for completing the temperature control step.

22. The temperature control sequence determining method according to claim 21, wherein:
the temperature control steps each involve, provided therefor, a target temperature for the temperature control step and optionally a temperature change rate at which to change the induction temperature;
the temperature control section, for a temperature control step involving the temperature change rate provided therefor, changes the induction temperature continuously at the temperature change rate from a start of the temperature control step with the temperature change rate so that the induction temperature will be equal to the target temperature;
the temperature control section, for a temperature control step involving no temperature change rate provided therefor, changes the induction temperature in steps from a start of the temperature control step with no temperature change rate so that the induction temperature will be equal to the target temperature;
the temperature control steps each further involve, provided therefor, a lapse time for the temperature control step and optionally a trigger temperature;

the temperature control section, for a temperature control step involving the trigger temperature provided therefor, completes the temperature control step with the trigger temperature the lapse time after the detected temperature reaches the trigger temperature; and the temperature control section, for a temperature control step involving no trigger temperature provided therefor, completes the temperature control step with no trigger temperature the lapse time after a start of the fourth temperature control step.

23. The temperature control sequence determining method according to claim 22, wherein:

the temperature of the thermosetting material at a time point at which the curing reaction rate of the thermosetting material has a value within a range of 0.05 to 0.2 is a gelation temperature; and the step (b) corrects the temperature control sequence by dividing a temperature control step among the temperature control steps, which temperature control step covers a time point at which the temperature of the temperature control section is equal to the gelation temperature, into two temperature control steps at a time point before the time point at which the temperature of the temperature control section is equal to the gelation temperature.

24. The temperature control sequence determining method according to claim 22, wherein:

the temperature of the thermosetting material at a time point at which the curing reaction rate of the thermosetting material has a value within a range of 0.05 to 0.2 is a gelation temperature; and the step (b) corrects the temperature control sequence by dividing a temperature control step among the temperature control steps, which temperature control step covers a time point at which the temperature of the temperature control section is equal to the gelation temperature, into two temperature control steps at a time point after the time point at which the temperature of the temperature control section is equal to the gelation temperature.

25. The temperature control sequence determining method according to claim 23, wherein:

the step (b), for the temperature control step covering the time point at which the temperature of the temperature control section is equal to the gelation temperature, corrects the temperature control sequence by (i) providing the temperature control step covering the time point, at which the temperature of the temperature control section is equal to the gelation temperature, with a value lower than a limit value of a heating capability of the heating and cooling section in a case where the temperature control step covering the time point, at which the temperature of the temperature control section is equal to the gelation temperature, has no temperature change rate provided therefor or by (ii) reducing the temperature change rate in a case where the temperature control step covering the time point, at which the temperature of the temperature control section is equal to the gelation temperature, has the temperature change rate provided therefor.

26. The temperature control sequence determining method according to claim 23, wherein:

the step (b), for the temperature control step covering the time point at which the temperature of the temperature control section is equal to the gelation temperature, corrects the temperature control sequence by reducing the target temperature.

27. The temperature control sequence determining method according to claim 22, wherein:

the step (b) corrects the temperature control sequence by providing one or more of the temperature control steps each with the trigger temperature that differs from the target temperature.

28. The temperature control sequence determining method according to claim 22, wherein:

the step (b) forms a variable group including one or more variables each specifying a step number of a temperature control step and the target temperature, temperature change rate, or lapse time for the temperature control step having the step number;

the step (b) creates a merit function that sequences, in order of operation, operands selected from a plurality of operand candidates; and the step (b) corrects the temperature control sequence by updating the merit function on a basis of an update condition set for each of the operands to update the merit function and by changing values of the variable group to allow the updated merit function to return a value close to a local minimum.

29. A temperature control sequence determining device for use in a molding device, the molding device including:
a heat transfer section for exchanging heat with a target object made of a thermosetting material; and
a temperature control section for controlling a temperature of the temperature control section itself or of the heat transfer section, the temperature control sequence determining device being for correcting a temperature control sequence specifying an operation of the temperature control section, the temperature control sequence determining device comprising a processor configured:

to predict a temporal shift in temperature and curing reaction velocity of the thermosetting material during a process of molding the target object; and to correct the temperature control sequence on a basis of the temporal shift predicted by the processor, the processor being configured to predict the temporal shift for a case in which the operation of the temperature control section is specified by the temperature control sequence on a basis of (i) a calculation formula Math. 1 below for calculating the curing reaction velocity of the thermosetting material, $$\frac{d\chi}{dt} = \left\{ A_1 \exp\left(-\frac{T_1}{T}\right) + A_2 \exp\left(-\frac{T_2}{T}\right) \chi^m \right\} (1-\chi)^n, \qquad [\text{Math. 1}]$$

where $d\chi/dt$ is the curing reaction velocity of the thermosetting material, $\chi$ is a curing reaction rate of the thermosetting material, t is time, T is an absolute temperature of the thermosetting material, and $A_1$, $T_1$, $A_2$, $T_2$, m, and n are reaction parameters peculiar to the thermosetting material, (ii) a calculation formula Math. 2 below for calculating a quantity of heat generated by the thermosetting material, $$q = QM \frac{d\chi}{dt}, \qquad [\text{Math. 2}],$$

where q is the quantity of the heat generated by the thermosetting material,

Q is a total generated heat density peculiar to the thermosetting material, and

M is a mass of the thermosetting material, (iii) an equivalent heat circuit for equivalently expressing heat generation and heat transfer in the thermosetting material, the heat transfer section, and the temperature control section by using a combination selected from among a temperature source, a heat flow source, thermal resistance, and heat capacity, and (iv) the temperature control sequence before the correction.

* * * * *